(12) United States Patent
Guilloux et al.

(10) Patent No.: US 8,109,631 B2
(45) Date of Patent: Feb. 7, 2012

(54) OPHTHALMIC PROGRESSIVE ADDITION LENS WITH CUSTOMIZED DESIGN FEATURE

(75) Inventors: Cyril Guilloux, Charenton-le-Pont (FR); Bruno Decreton, Charenton-le-Pont (FR); Diane De Gaude-Maris, Charenton-le-Pont (FR); Marie-Anne Berthezene, Charenton-le-Pont (FR); Celine Carimalo, Charenton-le-Pont (FR)

(73) Assignee: Essilor International, (Compagnie Générale d'Optique), Charenton le Pont (FR)

( * ) Notice: Subject to any disclaimer, the term of this patent is extended or adjusted under 35 U.S.C. 154(b) by 35 days.

(21) Appl. No.: 12/524,210

(22) PCT Filed: Jan. 18, 2008

(86) PCT No.: PCT/EP2008/050594
§ 371 (c)(1),
(2), (4) Date: Jul. 23, 2009

(87) PCT Pub. No.: WO2008/090102
PCT Pub. Date: Jul. 31, 2008

(65) Prior Publication Data
US 2010/0079722 A1 Apr. 1, 2010

(30) Foreign Application Priority Data

Jan. 24, 2007 (FR) ................................. 07 00484
Aug. 23, 2007 (EP) ................................. 07114889

(51) Int. Cl.
*G02C 7/02* (2006.01)
*G02C 7/06* (2006.01)
(52) U.S. Cl. ..................................... 351/177; 351/169

(58) Field of Classification Search .................. 351/169, 351/177
See application file for complete search history.

(56) References Cited

U.S. PATENT DOCUMENTS

| 6,074,062 | A | 6/2000 | Morris et al. |
| 6,318,859 | B1 | 11/2001 | Baudart et al. |
| 6,382,789 | B1 | 5/2002 | Baudart et al. |
| 7,860,594 | B2 * | 12/2010 | Andino et al. ................ 351/177 |

(Continued)

FOREIGN PATENT DOCUMENTS
EP 0 772 066 5/1997
(Continued)

*Primary Examiner* — Jordan Schwartz
(74) *Attorney, Agent, or Firm* — Cozen O'Connor

(57) ABSTRACT

A method for manufacturing an ophthalmic progressive addition lens (100) with customized design features adapted to a wearer, the method comprising the following steps: /a/ a providing step of a lens substrate; /b/ a modifying step in which a first target virtual lens is provided and modified so as to obtain a second target virtual lens, the second target virtual lens having a design feature parameter substantially equal to a customized design feature parameter; /c/ an optimizing step in which an optimized trial virtual lens is obtained by optimizing a trial virtual lens in such a manner that the optimized trial virtual lens has optical characteristics which are substantially equal to the characteristics of the second target virtual lens; and /d/ a manufacturing step of the ophthalmic progressive addition lens from the lens substrate according to the trial virtual lens. Method for the determination of a customized ophthalmic progressive addition lens with customized design features. Related computer program product.

33 Claims, 22 Drawing Sheets

U.S. PATENT DOCUMENTS

| | | |
|---|---|---|
| 2002/0171803 A1 | 11/2002 | Ahsbahs et al. |
| 2002/0176048 A1 | 11/2002 | Ahsbahs et al. |
| 2004/0246440 A1* | 12/2004 | Andino et al. ............... 351/177 |
| 2005/0179863 A1* | 8/2005 | Taguchi et al. ............... 351/177 |
| 2005/0270482 A1 | 12/2005 | Fisher et al. |
| 2006/0007393 A1 | 1/2006 | Haimerl et al. |
| 2006/0209255 A1 | 9/2006 | Donetti et al. |
| 2008/0088794 A1* | 4/2008 | Tanaka et al. ............... 351/177 |

FOREIGN PATENT DOCUMENTS

| | | |
|---|---|---|
| EP | 0 990 939 | 9/1999 |
| EP | 1 063 556 | 10/1999 |
| GB | 2 261 526 | 5/1993 |
| WO | WO00/73846 | 12/2000 |

* cited by examiner $\alpha' = h(\alpha)$ $\beta' = h(\beta)$ $(\alpha', \beta') = h(\alpha, \beta)$

OPHTHALMIC PROGRESSIVE ADDITION LENS WITH CUSTOMIZED DESIGN FEATURE

CROSS-REFERENCE TO RELATED APPLICATIONS

This application is the National Stage of International Application No. PCT/EP2008/050594, filed on Jan. 18, 2008, which claims the priority of French application Ser. No. 07/00484 filed on Jan. 24, 2007 and European Application No. 07114889.4, filed on Aug. 23, 2007. The contents of all applications are hereby incorporated by reference in their entirety.

FIELD OF THE INVENTION

The present invention relates to a method for manufacturing an ophthalmic progressive addition lens with customized design feature(s), and also to a method for the determination of a customized ophthalmic progressive addition lens.

BACKGROUND OF THE INVENTION

An ophthalmic progressive addition lens, or PAL, has an optical power that varies progressively along a line over the surface of this lens, known as meridian line. The meridian line connects a distance-vision point on the lens, to which the optical power and astigmatism of the lens are adapted in order to correct the distance vision of a wearer, to a near-vision point to which the optical power is adapted in order to correct the near vision of the wearer.

A method for vision correction traditionally includes measuring optical aberration data of a wearer's eye, usually performed by optometrists or ophthalmologists, determining the lens parameters and offering to the wearer a plurality of model lenses with different lens "designs".

The wearer's vision parameters are measured using for example trial lenses, an aberrometer, a wave-front sensor, grating or other known method and/or apparatus.

Other vision parameters can be obtained such as the wearer's vertex distance, pupil size, pupil distance, frame information, gaze directions.

The optical surface or "design" imparts the optical correction of the material. Given the infinite number of eyesight corrections, the numbers of designs is almost infinite.

For cost and manufacture reasons, only a limited number of "model designs" is predetermined by the lens manufacturers.

Such "model designs" are of great importance when considering progressive addition lenses (PAL).

PAL have gained worldwide acceptance as the most performant ophthalmic lenses for correction of presbyopia because they provide comfortable vision at all distances.

A PAL is designed not only to restore a presbyope's ability to see clearly at all distances but also to optimally respect all physiological visual functions, in particular:
  foveal vision where coordination of the body, head and eye movements, in relation to the objects' location in the vision, defines the power value needed at each point of the progression. The field of gaze is determined by the natural coordination of horizontal eye and head movements;
  extra-foveal vision (provided by the periphery of the retina) which provides space and form perception and is directly influenced by the distribution of prism on the progressive lens surface. The variation of prismatic effects plays also a role in the wearer's comfort when movement is perceived;
  binocular vision where, for optimal fusion of the simultaneous perception of the two eyes, the images produced by the right and left lenses must be formed on corresponding retinal points and display similar optical properties in all directions of gaze.

Progressive lens designers work towards respecting these physiological functions and propose a limited number of optimized designs which are tested through rigorous clinical trials. A plurality of "model designs" is offered by each lens maker.

The optometrist or ophthalmologist proposes usually a lens "model design" that may be the result of an analysis of the viewing behavior of the wearer.

According to a known embodiment, an ophthalmic lens which is adapted to the vision of a wearer is obtained starting from a semi-finished lens with the chosen "model design" which is manufactured in large volume, and which has a finished front face. In other words, the front face of the semi-finished lens has local values of average sphere and of cylinder that vary between different points of this face. The rear face, also called back face, of the semi-finished lens is used to adapt the ophthalmic correction to the ametropia of the wearer. For this purpose, it is re-machined according to a prescription established for the wearer. The rear face of the final lens is usually of simple shape: it has uniform values of average sphere and of cylinder which, in combination with the front face, give the lens optical characteristics that conform to the prescription.

The rear face may also comprise a progressive addition surface so as the lens is called a "dual add" PAL.

The semi-finished lens is selected from amongst several standard models (based on the "model design") as a function of a curvature value of the front face at the distance-vision point and from an addition value. Depending on these values, the front face of a progressive semi-finished lens has fixed design features values, which are also called standard designs features values. They are determined for average conditions of use of the lens and are fixed when the semi-finished lens is moulded.

The principal standard design features are selected in the list consisting of the standard size parameters of the different vision zones of the progressive addition lens (such as for example the near vision zone, the intermediate vision zone, the distance vision zone), standard inset of a wearer, standard frame design parameters, standard viewing preferences.

In a standard progressive addition lens the size of the distance vision zone is greater than the size of the near vision zone, which is greater than the size of the intermediate zone.

In a progressive addition lens, the near-vision point can be shifted horizontally with respect to a vertical line passing through the distance-vision point, when the lens is in a position of use by its wearer. This shift, which is in the direction of the nasal side of the lens, is usually referred to as "inset". It depends on the optical power of the lens, on the variation in convergence of the view of the wearer between his distance vision and near vision, on the distance of observation of an object, on the prismatic deviation of the lens and on the eye-lens distance, notably. FIG. 1a indicates the positions of the distance-vision and near-vision points of an ophthalmic lens 100, respectively denoted VL and VP, the mounting cross, denoted CM, the meridian line, denoted LM, and the inset, denoted In. FIG. 1b is a profile view of the lens 100, showing the front face of the latter, which is convex and referenced S0, and its concave rear face S1.

Now, it is also known for some design features of a progressive lens to be adapted according to the wearer for whom the lens is designed, in particular in order to reduce the time that could be required for the wearer to become accustomed to this progressive lens. Such an adaptation of the lens is referred to as 'customization' of the design feature.

As for an example where the design feature parameter is the inset, this can be achieved by simply rotating the semi-finished lens about its optical axis, before the rear face has been adjusted to the prescription and before the lens is cut to the dimensions of a frame of a pair of glasses. The inset value can thus be customized, by means of the angle of rotation, as a function of the measurements made on the wearer. But then all the characteristics of the lens, including the variations in astigmatism outside of the distance-vision and near-vision regions, are simultaneously rotated. This results notably in a reduction in the width of the distance-vision region, measured in a horizontal direction, which may be detrimental to the comfort of the wearer.

There is thus, now a trend to customize progressive addition lenses to the wearer's eyes specificities.

There is also an increasing need for customizing progressive addition lenses to the wearer's habits or to his specific needs, such as for example, customizing lenses for car driving or sport training or office working including computer use or other every day life needs, or also, when the wearer choices a particular frame which geometry is not adapted to standard progressive addition lenses.

The choice of specific design feature parameters could be introduced to produce new "design model" but new clinical trials would then be necessary and it is then a very expensive solution to customize progressive addition lenses.

One goal of the present invention therefore consists in providing a method for manufacturing a progressive addition lens with customized design feature(s), which does not have the drawbacks mentioned hereinabove.

Another goal consists in providing a method that is compatible with the manufacturing of a correction lens starting from a substrate, such as for example semi-finished progressive lens, whose front face is not modified by re-working.

SUMMARY OF THE INVENTION

For this purpose, one subject of the invention is a method for manufacturing an ophthalmic progressive addition lens with customized design feature(s) adapted to a wearer, the method comprising the following steps:

/a/ a providing step of a lens substrate;

/b/ a modifying step in which a first target virtual lens is provided and modified so as to obtain a second target virtual lens, the second target virtual lens having a design feature parameter substantially equal to a customized design feature parameter;

/c/ an optimizing step in which an optimized trial virtual lens is obtained by optimizing a trial virtual lens in such a manner that the optimized trial virtual lens has optical characteristics which are substantially equal to the characteristics of the second target virtual lens; and /d/ a manufacturing step of the ophthalmic progressive addition lens from the lens substrate according to the trial virtual lens.

It is then possible, according to the present invention, to customize progressive addition lenses without creating a new "design model", and to customize the design features of a known design, such as for example a design model, according to numerous wearer's needs.

As for an example, in an embodiment according to the invention, the rear face of the lens is used both for obtaining the prescription and for modifying the apparent value of the design feature of the lens, with respect to the standard design feature value of the front face of the lens. The rear face can for example therefore be used in order to customize the design feature of the lens. For this reason, it has a shape that is generally complex. In other words, the values of average sphere and of cylinder of the rear face vary between different points of the latter.

The front face of the semi-finished lens can then not be modified by re-working in order to form the finished lens with customized design feature, in a method according to the invention. For this reason, the customization of the design feature of progressive addition lenses does not require the number of models of progressive semi-finished lenses to be increased, with respect to a range of semi-finished lenses which are defined by their curvature values and their addition values.

The shape of the rear face of the lens that has to be manufactured is determined by digital optimization. Such a determination can be carried out simply and quickly, by using simple computer means that are widely available, such as a personal computer.

According to further embodiments of the present invention, which can be considered alone or in combination:

- the second target virtual lens corresponds to the vision correction prescribed for the wearer and has a design feature parameter substantially equal to a customized design feature parameter;
- at least one customized design feature is chosen in the list consisting of the size parameters of vision zones of the ophthalmic progressive addition lens, the inset (In) of the wearer, frame design parameters of the frame chosen by the wearer, wearer's viewing preferences;
- the size parameters of the vision zones of the ophthalmic progressive addition lens are chosen between the size parameters of the near vision zone, the intermediate vision zone such as the channel width or height, the distance vision zone;
- the size parameters of a vision zone are chosen in the list consisting of the width, the height or a combination thereof, the surface of a vision zone;
- the size parameters of vision zones of the ophthalmic progressive addition lens are ratio between two size parameters of two different vision zones;
- the frame design parameters are chosen in the list consisting of the width, the height or a combination thereof, such as for example the aspect ratio of the frame.

According to preceding feature, the wearer's viewing preferences are chosen in the list consisting of maximizing the distance viewing comfort, maximizing the intermediate viewing comfort, maximizing the near viewing comfort.

According to an embodiment of the present invention, the ophthalmic progressive addition lens (100) comprises:

a front face (S0) with progressive power addition between a distance-vision point (VL) and a near-vision point (VP) of the said ophthalmic progressive addition lens, the said front face having a standard design feature parameter, and a rear face (S1) adapted in order to provide, in combination with the front face, a vision correction according to a prescription established for a wearer of the said ophthalmic progressive addition lens, and also adapted in order to give to said ophthalmic progressive addition lens an apparent design feature parameter customized for the said wearer that is different from the standard design feature parameter of the front face.

According to preceding embodiment:

step /a/ is obtaining a semi-finished lens having the power addition front face (S0) and the standard design feature parameter;

step /b/ is defining a target virtual lens comprising a front face with a power addition substantially equal to the addition of the lens to be manufactured, and a rear face adapted so that the said target virtual lens corresponds to the vision correction prescribed for the said wearer, the said front face of the target virtual lens also having a design feature parameter substantially equal to the customized apparent design feature parameter;

step /c/ is by calculation, optimizing a trial virtual lens having the fixed front face of the semi-finished lens, and having a variable rear face, in such a manner that the said trial virtual lens has optical characteristics substantially equal to the characteristics of the target virtual lens; and step /d/ is machining the rear of the semi-finished lens (S1) according to the rear face of the optimized trial virtual lens.

According to the same preceding embodiment, the step /b/ itself comprises the following two sub-steps:

/b1/ define an intermediate virtual lens having the front face of the semi-finished lens (S0) and a virtual rear face with uniform values of average sphere and of cylinder selected such that the said intermediate virtual lens corresponds to the prescribed vision correction; and /b2/ define the target virtual lens by applying by calculation a shear function to optical characteristics of the said intermediate virtual lens, the shear function being applied in a direction parallel to a horizontal direction (X) in at least a part of the lens situated underneath the distance-vision point, with respect to a usage position of the ophthalmic progressive addition lens, and being selected in such a manner that the said target virtual lens has the customized apparent design feature parameter.

According to the same preceding embodiment, the step /b/ itself comprises the following sub-steps:

/b1'/ apply by calculation a shear function to surface characteristics of the front face of the semi-finished lens (S0), in such a manner as to obtain a modified virtual front face having the progressive power addition of the semi-finished lens and the customized design feature parameter, the shear function being applied in a direction parallel to a horizontal direction (X) in at least a part of the front face situated underneath the distance-vision point, with respect to a usage position of the ophthalmic progressive addition lens;

/b2'/ optimize surface characteristics of the virtual front face modified by the shear function, with respect to target surface characteristics corresponding to the power addition of the semi-finished lens and to the customized design feature parameter; and /b3'/ define the target virtual lens by associating the front face modified by the shear function and optimized with a virtual rear face with uniform values of average sphere and of cylinder selected in such a manner that the said target virtual lens corresponds to the prescribed vision correction.

According to the same preceding embodiment, the step /b/ itself comprises the following sub-steps:

/b1"/ obtain at least two reference front faces corresponding to two respective design features parameters;

/b2"/ calculate the front face of the target virtual lens by mixing the said two reference front faces, in such a manner as to obtain a mixed front face having the customized design features parameters; and /b3"/ define the target virtual lens by associating the mixed front face with a virtual rear face with uniform values of average sphere and of cylinder selected in such a manner that the said target virtual lens corresponds to the prescribed vision correction.

According to preceding embodiment, one of the two reference front faces obtained in step /b1"/ is the front face of the semi-finished lens (S0) obtained in step /a/.

According to preceding embodiments:

the optimization in step /c/ is carried out by initially assigning to the trial virtual lens a rear face corrected with the difference between the front face of the semi-finished lens (S0) and the front face of the target virtual lens, with respect to the uniform values of average sphere and of cylinder, the target virtual lens is defined in step /b/ with a base value of front face different from a base value selected for the semi-finished lens as a function of the prescribed vision correction, in such a manner as to minimize optical aberrations of the ophthalmic progressive addition lens manufactured.

According to an embodiment of the present invention in which a customized design feature is a frame design parameter, the method comprises following steps:

measuring parameters representing the frame chosen by the wearer;

choosing an initial distribution of power and resulting astigmatism defect targets for each direction of viewing under wearing conditions in an ordinary frame, thus providing a first target virtual lens;

calculating transformation coefficients using the measured parameters representing the chosen frame and standard parameters;

calculating a personalized distribution of the power and resulting astigmatism defect targets on the lens by applying the calculated transformation coefficients to the initial distribution, thus obtaining a second target virtual lens;

calculating the power required on the lens for each direction of viewing by successive iterations in order to obtain the target power defect and the target astigmatism defect and obtaining an optimized trial virtual lens by optimization of a trial virtual lens.

According to preceding embodiment, the stage of measuring parameters representing the frame comprises the stages of:

measuring the width (A) of the cut-out lens;

measuring the width of the bridge (P) of the chosen frame;

measuring the interpupillary distance of the wearer (EP);

measuring the fitting height (HD, HG, HDd, HGd) as the vertical distance between a point of the lens (CM) marking the primary direction of viewing under wearing conditions and a given point of the frame;

calculating a horizontal parameter (A') taking into account the width of the cut-out lens, the bridge width and the interpupillary distance measured;

calculating a vertical parameter (B') taking into account the fitting height measured.

According to other features:

the stage of calculating transformation coefficients comprises the stages of calculating:

a horizontal coefficient ($\gamma$) such as the ratio between a horizontal parameter (A') calculated for the frame chosen by the wearer and a standard horizontal parameter (A'av);

a vertical coefficient (δ) such as the ratio between a vertical parameter (B') calculated for the frame chosen by the wearer and a standard vertical parameter (B'av).

the stage of calculation of transformation coefficients comprises the stages of:
  calculating a vertical coefficient (δ) such as the ratio between a vertical parameter (B') calculated for the frame chosen by the wearer and a standard vertical parameter (B'av);
  determining a horizontal coefficient (γ) set as being set equal to the vertical coefficient (δ).

the vertical coefficient (δ) is limited to a lower value equal to 0.65 and to an upper value equal to 1.5.

the horizontal coefficient (γ) is limited to a lower value equal to 0.55 and to an upper value equal to 1.25.

the ratio (δ1γ) of the vertical coefficient (δ) over the horizontal coefficient (γ) is limited to a lower value equal to 0.5 and to an upper value equal to 3.0.

the stage of calculating the personalized distribution of the power and resulting astigmatism defect targets on the lens comprises the stages of:
  determining a vertical and horizontal mesh associating a point to each direction of viewing under wearing conditions, there being associated with each point of the mesh spherical coordinates (β, α) of the direction of viewing and power and resulting astigmatism defect values corresponding to the initial distribution chosen for the targets;
  at each point of the mesh, applying the transformation coefficients calculated to the spherical coordinates (β, α) maintaining the power and resulting astigmatism defect target values constant.

According to preceding embodiments, applying the transformation coefficients calculated (γ, δ) to the spherical coordinates (β, α) consists in multiplying the horizontal angular value (β) by the horizontal coefficient (γ) and multiplying the vertical angular value (α) by the vertical coefficient (δ).

According to preceding embodiment, calculating the personalized distribution of the targets is carried out whilst maintaining constant the ratio of the area of the lens surface for which the resulting astigmatism defect is less than or equal to 0.5 diopters over the total surface of the cut-out lens.

The invention relates also to a method for the determination of a customized ophthalmic progressive addition lens with customized design features, with the provision that the design feature is not a frame design parameter, comprising:
  a modifying step in which a first target virtual lens is provided and modified so as to obtain a second target virtual lens, the second target virtual lens having a design feature parameter substantially equal to a customized design feature parameter;
  an optimizing step in which an optimized trial virtual lens is obtained by optimizing a trial virtual lens in such a manner that the optimized trial virtual lens has optical characteristics which are substantially equal to the characteristics of the second target virtual lens.

According to preceding embodiment the ophthalmic progressive addition lens comprises:
  a front face (S0) with progressive power addition between a distance-vision point (VL) and a near-vision point (VP) of the said ophthalmic progressive addition lens, the said front face having a standard design feature parameter, and
  a rear face (S1) adapted in order to provide, in combination with the front face, a vision correction according to a prescription established for a wearer of the said ophthalmic progressive addition lens, and also adapted in order to give to said ophthalmic progressive addition lens an apparent design feature parameter customized for the said wearer that is different from the standard design feature parameter of the front face, and the method comprising the following steps:
  /a/ providing a semi-finished lens design having the said power addition front face (S0) and the said standard design feature parameter;
  /b/ define a target virtual lens comprising a front face with a power addition substantially equal to the addition of the ophthalmic progressive addition lens to be manufactured, and a rear face adapted so that the said target virtual lens corresponds to the vision correction prescribed for the said wearer, the said front face of the target virtual lens also having a design feature parameter substantially equal to the customized apparent design feature parameter;
  /c/ by calculation, optimize a trial virtual lens having the fixed front face of the semi-finished lens, and having a variable rear face, in such a manner that the said trial virtual lens has optical characteristics substantially equal to the characteristics of the target virtual lens.

According to a further embodiment of said method for the determination of a customized ophthalmic progressive addition lens, the second target virtual lens corresponds to the vision correction prescribed for the wearer and has a design feature parameter substantially equal to a customized design feature parameter;

It has to be noted that features of the here above mentioned method for manufacturing an ophthalmic progressive addition lens may be features of the present method for the determination a customized ophthalmic progressive addition lens, with the provision that said features are not specific of design features of a frame.

The invention also relates to a computer program product comprising one or more stored sequences of instructions that is accessible to a processor and which, when executed by the processor, causes the processor to carry out at least one of the steps of the different embodiments of the preceding methods.

The invention also relates to a computer-readable medium carrying one or more sequences of instructions of the preceding computer program product.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other features and advantages of the present invention will become apparent in the description herein below of non-limiting exemplary embodiments, making reference to the appended drawings, in which:

FIGS. 2b-2g are contour maps relating to a progressive addition lens with a customized design feature, which is the inset in the present example, manufactured using a method according to the embodiment in FIG. 2a;

FIGS. 3b-3k are contour maps relating to a progressive addition lens with a design feature, which is the inset in the present example, manufactured using a method according to the embodiment in FIG. 3a;

FIGS. 4b-4i are contour maps relating to a progressive addition lens with a design feature, which is the inset in the present example, manufactured using a method according to the embodiment in FIG. 4a;

DETAILED DESCRIPTION

In the framework of the invention, the following terms have the meanings indicated herein below:
optical axis of the addition lens: direction perpendicular to the front face of the lens and passing through the optical centre of the latter;
distance-vision region: region of the lens that surrounds the distance-vision point, and within which the local optical characteristics of optical power and of astigmatism of the lens are substantially identical to those at the distance-vision point;
near-vision region: region of the lens that surrounds the near-vision point, and within which the local optical characteristics of optical power and of astigmatism of the lens are substantially identical to those of the near-vision point;
addition of a progressive lens: difference between the value of optical power of the lens at the near-vision point and that at the distance-vision point;
optical characteristics of a lens: data on optical power, astigmatism, aberration, etc., relating to the modifications of a light beam that passes through the lens;
prescription: set of optical characteristics of optical power, of astigmatism and, where relevant, of addition, determined by an ophthalmologist in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription for a progressive lens comprises values of optical power and of astigmatism at the distance-vision point and, where appropriate, an addition value;
surface characteristics of a lens: geometrical data relating to one face of the lens, such as values of average sphere or of cylinder, for example;
average sphere, denoted D: (N−1) times the half-sum of the inverses of the two radii of curvature of a surface, denoted A1 and R2, and determined at the same point on the latter. In other words: $D=(N-1)\times(1/R1+1/R2)$, where N is the index of refraction of the lens, and
cylinder, denoted C: (N−1) times the absolute value of the half-difference of the inverses of the two radii of curvature of a surface, determined at the same point on the latter. In other words: $C=(N-1)\times(1/R1-1/R2)$.
"height" is used to define a lens or a lens zone dimension corresponding to a vertical when the sight is horizontal;
"width" is used to define a lens or a lens zone dimension corresponding to an horizontal when the sight is horizontal.

Figure 1A:
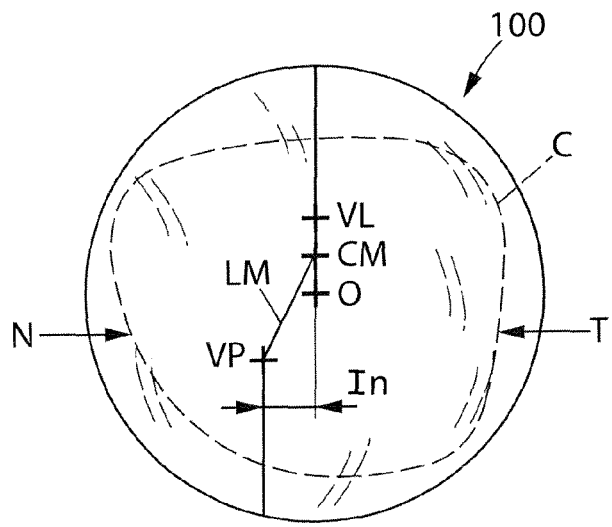
FIGS. 1a and 1b are plan and profile views, respectively, of an ophthalmic progressive addition lens, which indicates certain geometrical or optical data on this lens.

FIG. 1a shows schematically an addition lens 100, before the latter has been cut out around a contour C to the dimensions of a frame recess of a pair of glasses. In the figure, the nasal and temporal sides of the lens, respectively denoted N and T, the meridian line LM, the distance-vision and near-vision points, respectively denoted VL and VP, the inset In, and an optical centre of the lens, denoted O, are indicated.

Figure 1B:
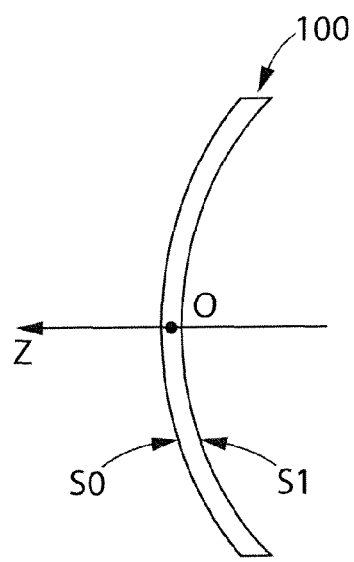

FIG. 1b shows the front and rear faces of the lens 100, respectively denoted S0 and S1, together with the optical axis of the lens, denoted Z.

When the lens 100 is a semi-finished lens, this can be chosen from amongst a range of 60 models for example, which consists of five available values for the curvature of the front face at the distance-vision point, and for each of these values of curvature, of twelve available values for the addition. Each semi-finished lens in this range has a standard inset value, which is fixed for the corresponding model. It also has his other own standard design features.

Depending on the prescription for a glasses wearer, a semi-finished lens is selected from one of the models available in the range, starting from which the final lens will be manufactured. This manufacturing consists in a re-work by machining of the rear face of the lens, where required the application of functional coatings on the faces of the lens, and the cutting out of the lens. In a known manner, the functional coatings can be, without limitation, an antireflective coating, a scratch-resistant coating, a dirt-repellent coating, etc., or a combination of these.

Figure 2A:
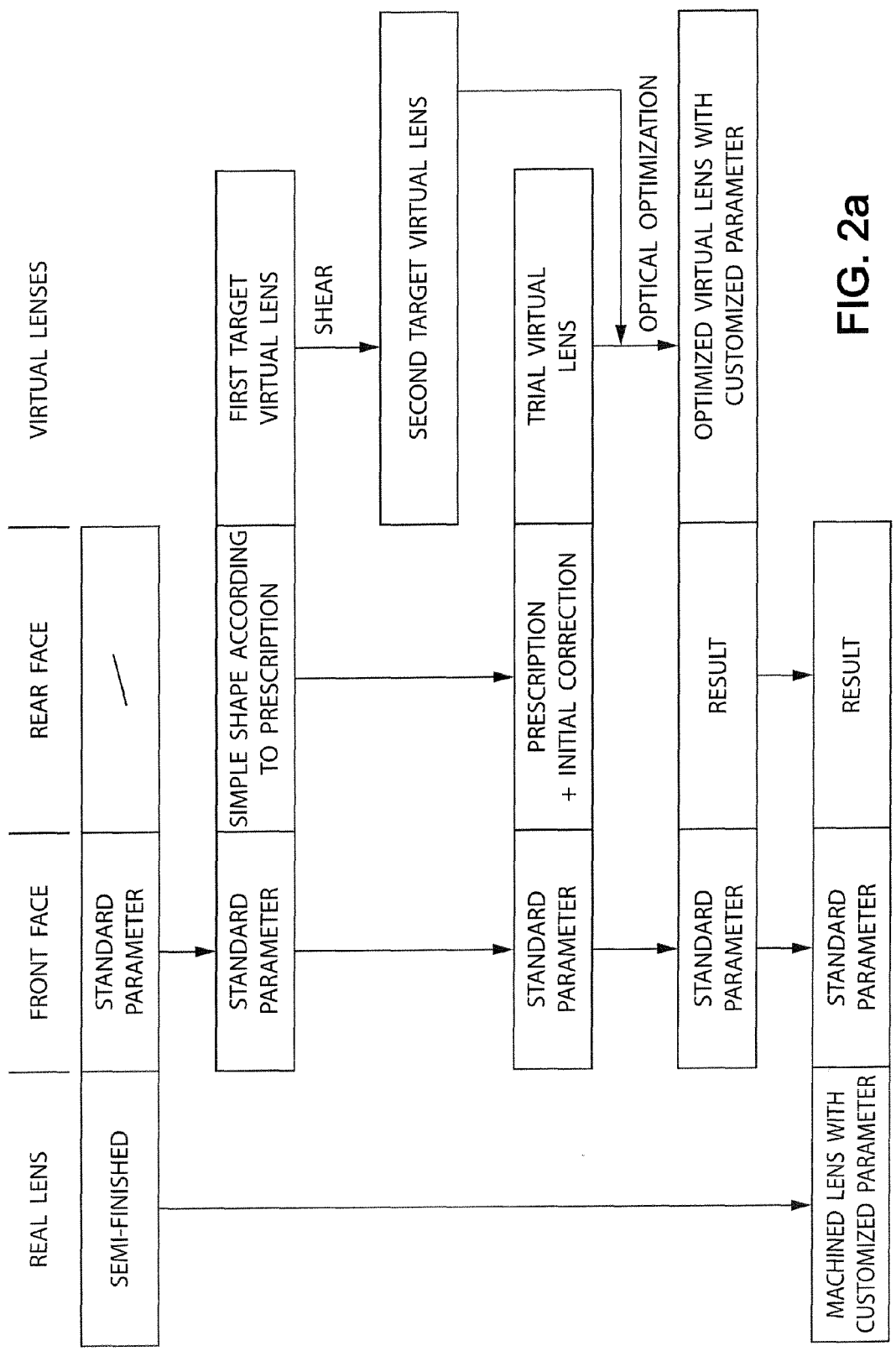
FIG. 2a is a flow diagram of the use of geometrical data which corresponds to a first embodiment of the invention.
Figure 3A:
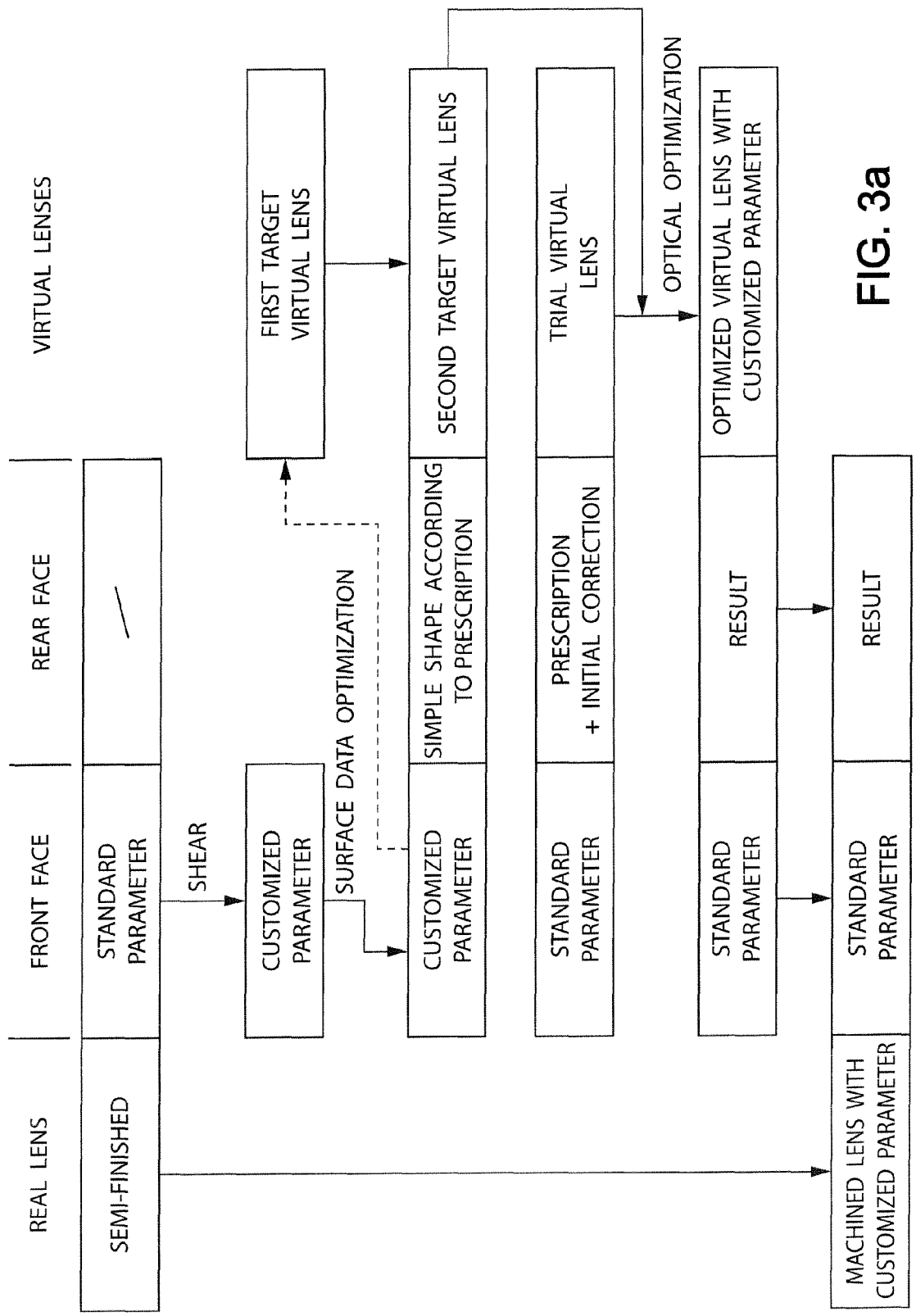
FIGS. 3a and 4a correspond to FIG. 2a, for a second and third embodiment of the invention, respectively.
Figure 4A:
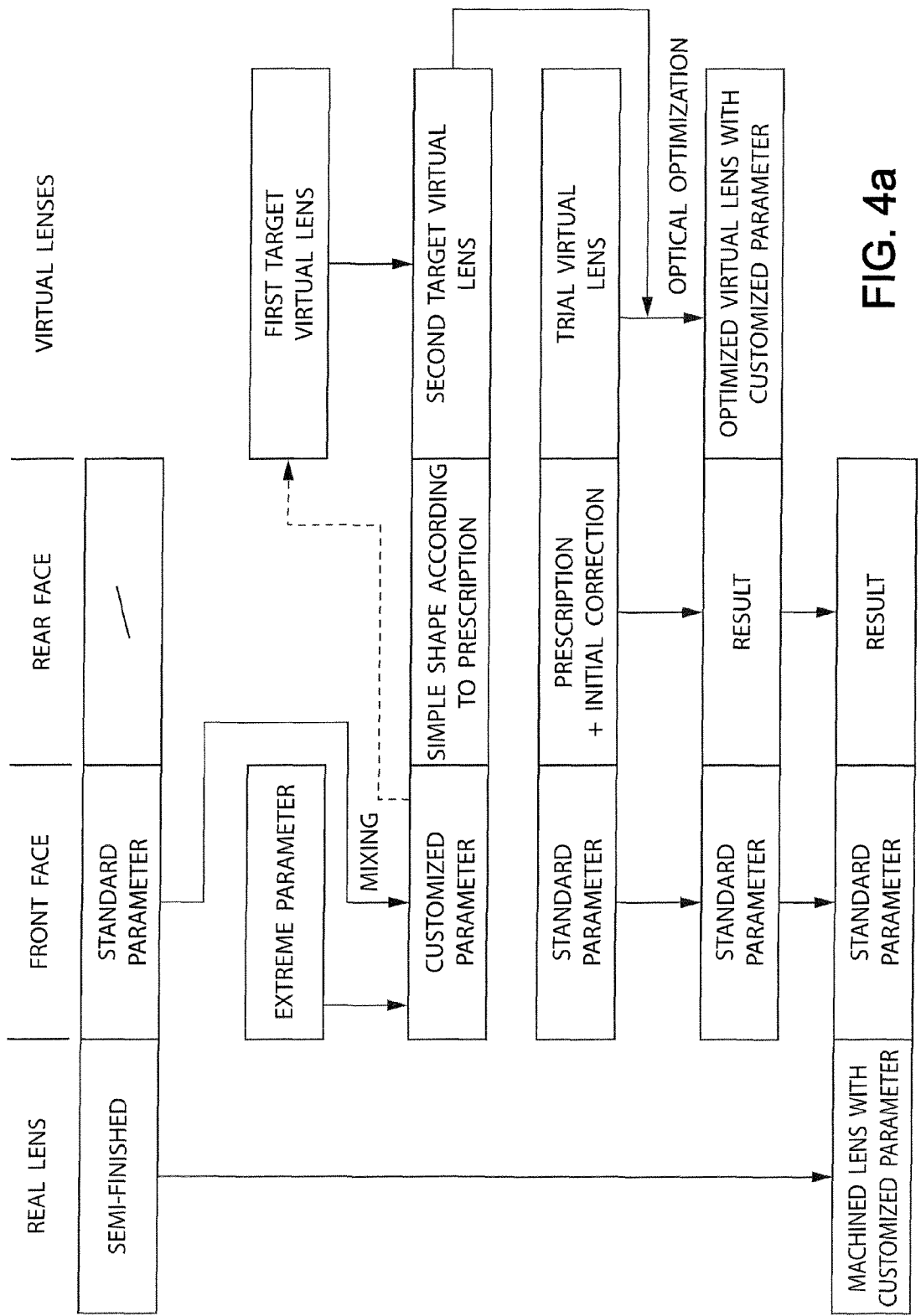
Figure 4B:
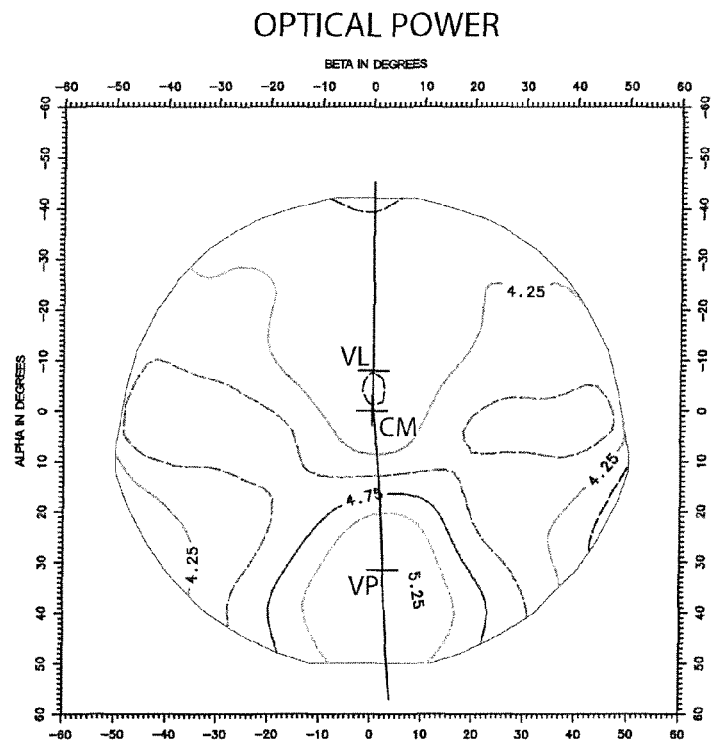
Figure 4C:
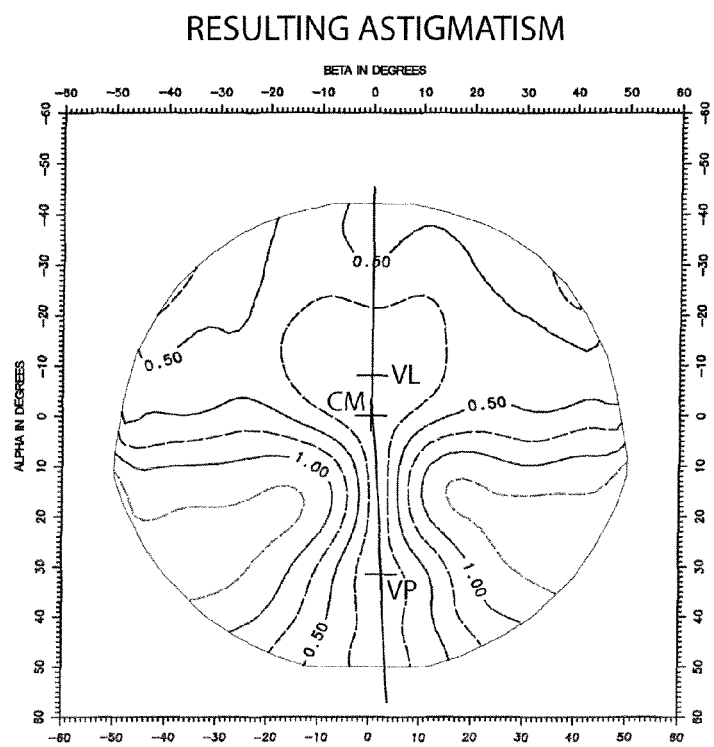
Figure 4D:
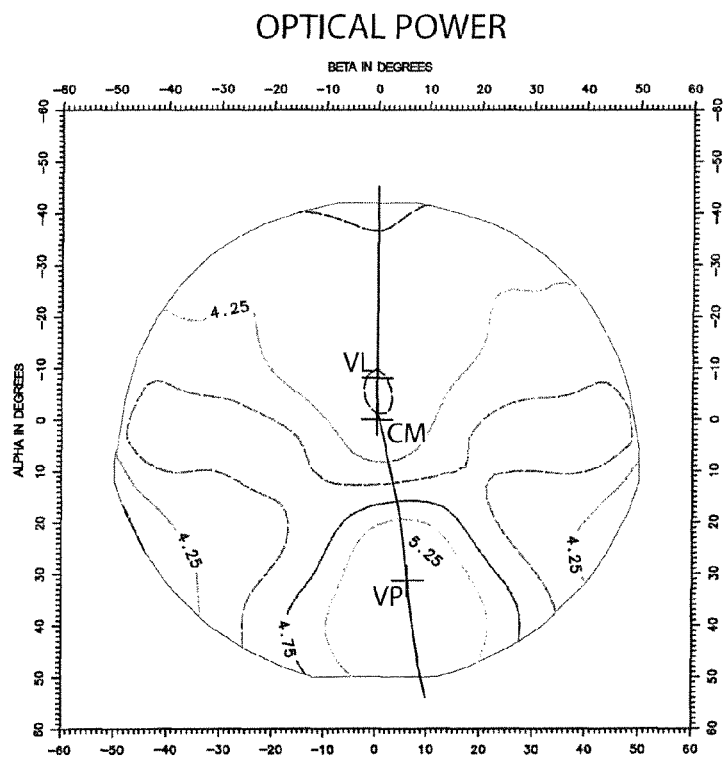
Figure 4E:
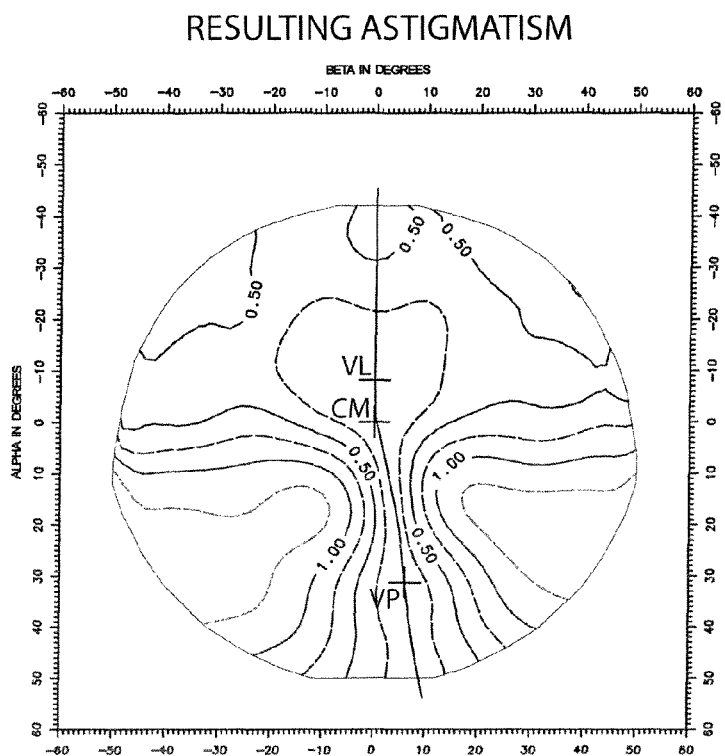
Figure 4F:
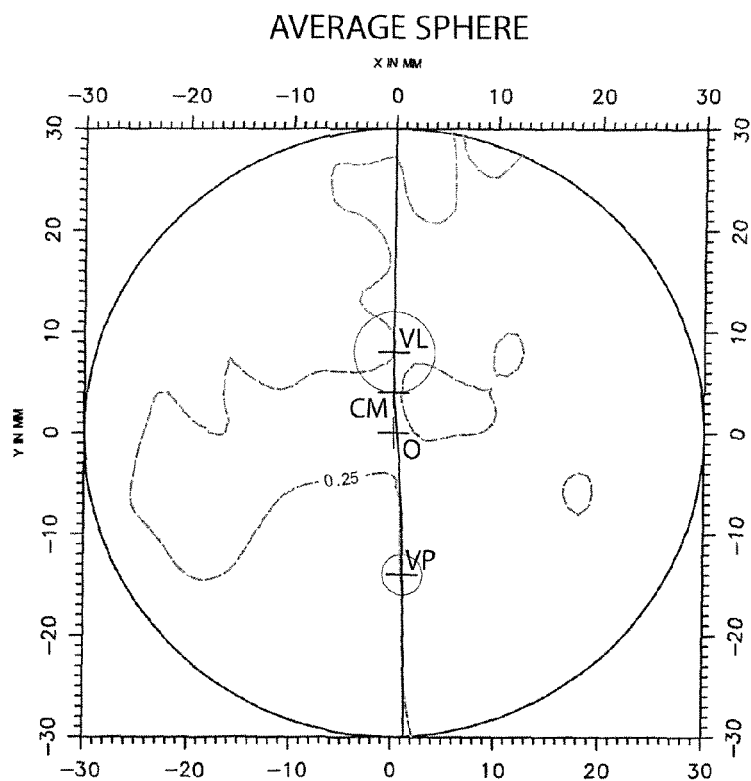
Figure 4G:
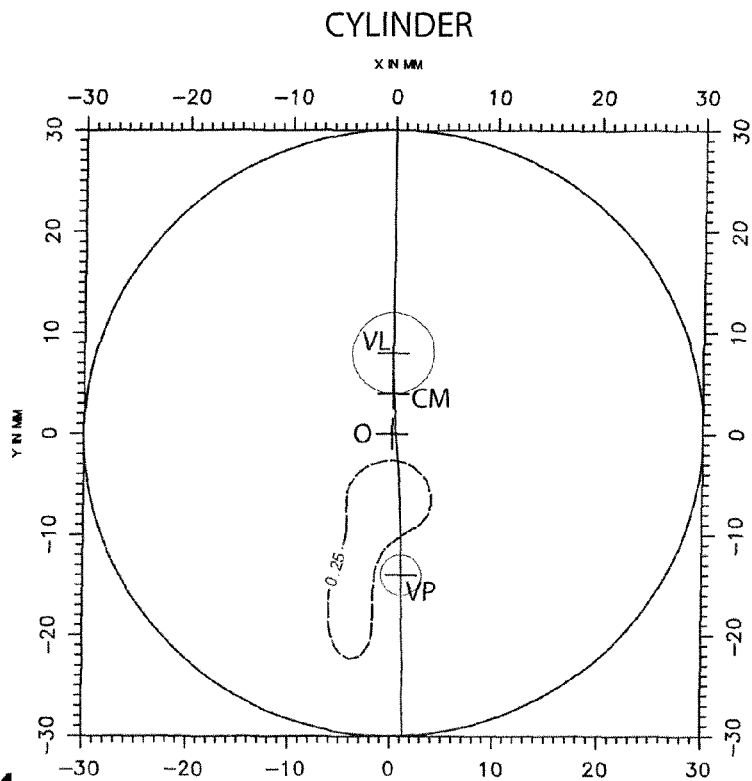

The supply of the semi-finished lens as a function of the prescription of the wearer corresponds to the first line of FIGS. 2a, 3a and 4a. The front face S0 of the lens 100 is thus known. The aim of the manufacturing of the lens which is now described consists in determining and in machining the rear face S1 of the lens 100, in order to obtain the ametropic correction prescribed for the wearer, together with a customized design feature value for the latter. The customized design feature value can be determined from measurements that are carried out on the wearer. Determinable customized design feature value are for example the inset of the wearer that relate for example to the distance between the apex of the cornea and the lens for the chosen frame, the variation in the convergence of the gaze for objects which are observed at variable distance, the reading distance, etc, or the customized design feature that can relate to another specific need of the wearer.

In FIGS. 2a, 3a and 4a, surface data corresponding to the same face of the lens 100 are indicated in columns, so as to allow easier displaying of the corresponding implementations. Said surface data are defined or calculated with standard design features, using standard design features parameters. The vertical arrows indicate the variation or the use of these data values for each implementation. Each row displays the surface data of the real lens or of a virtual lens that corresponds to one step of the method. This lens is indicated at the beginning of the row or at the end of it, according to whether it is a real lens (semi-finished lens or finished lens) or a virtual lens. In the framework of the invention, a virtual lens is a lens whose front and rear faces are numerically defined, and which is used to perform optical or surface calculations or which results from such calculations.

A first embodiment of the invention is now described, with reference to FIG. 2a. In this first embodiment, the step /b/ of the method of the invention, which consists in defining the target virtual lens, itself comprises the two following sub-steps:

/b1/ define an intermediate virtual lens which is a first target virtual lens that has the front face of the semi-finished lens and that has a virtual rear face with uniform values of average sphere and of cylinder selected such that the intermediate virtual lens corresponds to the prescribed vision correction; and /b2/ define the target virtual lens which is the second target virtual lens by applying by calculation a shear function to optical characteristics of the intermediate virtual lens, the shear function being applied in a direction parallel to a horizontal direction in at least a part of the lens situated underneath the distance-vision point, with respect to a usage position of the ophthalmic lens, and being selected in such a manner that the target virtual lens has the customized apparent design feature value.

The rear face of the lens is then machined according to a virtual lens, which is optimized so as to have both the customized design feature value, determined for the wearer, and the ametropic correction prescribed for him. In a known manner, such an optimization is performed digitally starting from a target virtual lens, in such a manner as to arrive at the distributions of the optical quantities, such as the optical power and the astigmatism. Programmes designed to carry out such optimizations are assumed to be known to those skilled in the art and are not described here.

In this first embodiment of the invention, the target virtual lens is determined in two successive steps. The virtual lens is generated digitally, with the front face of the semi-finished lens and a simple rear face that corresponds to the prescription. A simple face refers to a face with values of average sphere and of cylinder that are constant between any two points of the latter. The rear face of the intermediate virtual lens is therefore selected in the manner generally practiced for a progressive lens prior to the present invention. The front face of the intermediate virtual lens is identical to that of the semi-finished lens. The intermediate virtual lens therefore has an apparent design feature value which is equal to the standard design feature value of the front face of the semi-finished lens.

The target virtual lens is then defined from the intermediate virtual lens, in such a manner as to have an apparent design feature value which is equal to the customized design feature value determined for the wearer. For this purpose, a shear function is digitally applied to the optical characteristics of the intermediate virtual lens, over all or part of the surface of the latter. This shear function is selected in such a manner as to transform the design feature value of the intermediate virtual lens into the customized design feature value. A shear function is understood to mean a translation of the optical properties of the lens, with respect to a fixed coordinate system that is associated with the lens, whose translation amplitude varies along a direction perpendicular to the direction of translation.

The optimization can be carried out by using a trial virtual lens which is modified at each iteration of the optimization process. This trial virtual lens has a fixed front face which is identical to that of the semi-finished lens, and a rear face which is variable. A simple rear face, which corresponds to the prescription established for the wearer, can be adopted as initial rear face of the trial virtual lens.

The trial virtual lens is then optimized with respect to the optical characteristics of the target virtual lens. This optimization transforms the rear face of the trial virtual lens in such a manner that the latter performs a conversion of the apparent design feature value of the lens. The value that is finally obtained is close to the customized design feature value determined for the wearer. The wording "close" is used to characterize a difference between two values that is equal or less than a given threshold; such a threshold can be introduced as an optimisation parameter. The geometry of the rear face of the virtual lens thus optimized is denoted RESULT in FIG. 2a.

Surface data of the rear face are then deduced from these optical characteristics, such as values of average sphere and of cylinder, at points of a mesh on the rear face. The rear face S1 of the semi-finished lens 100 is then machined according to this data, for example using a three-axis machining tool.

FIGS. 1c, 2b to 2g relates to embodiments where the inset is the design feature to be customized.

Figure 1C:
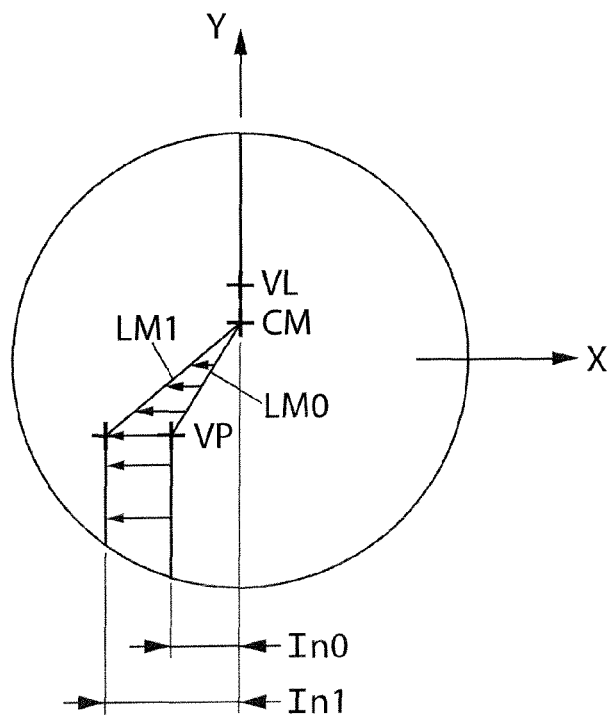
FIG. 1c illustrates the principle of a shear function.

FIG. 1c illustrates the transformation of the meridian line of the intermediate virtual lens, denoted LM0, into a meridian line of the target virtual lens, denoted LM1. The horizontal arrows that connect LM0 to LM1 correspond to the length of the translation at different heights on the lens. The direction of translation is parallel to the direction X indicated in FIG. 1c, and the translation length varies in the direction Y. In particular, the translation length, which can be zero above the distance-vision point VL, varies between VL and the near-vision point VP, and can be constant below VP. In0 and In1 indicate the inset values before and after the application of the shear function. They respectively correspond to the intermediate virtual lens and to the target virtual lens. In the particular exemplary embodiment which corresponds to the FIGS. 2a-2g, the shear function is defined in two successive parts, one above the mounting cross CM and which corresponds to no shear, the other below the mounting cross CM and which corresponds to a variable shear.

These embodiments of the method according to the invention allow the inset of a progressive addition lens to be modified, without reducing the respective widths of the distance-vision and near-vision regions, or without such a reduction being significant. The comfort of the user of the lens is thus maintained.

Figure 2B:
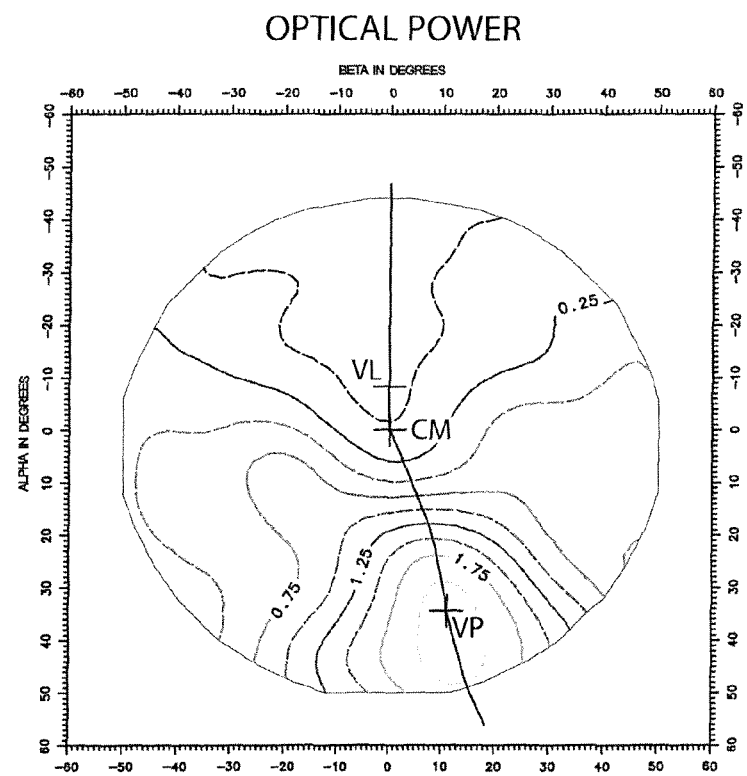
Figure 2C:
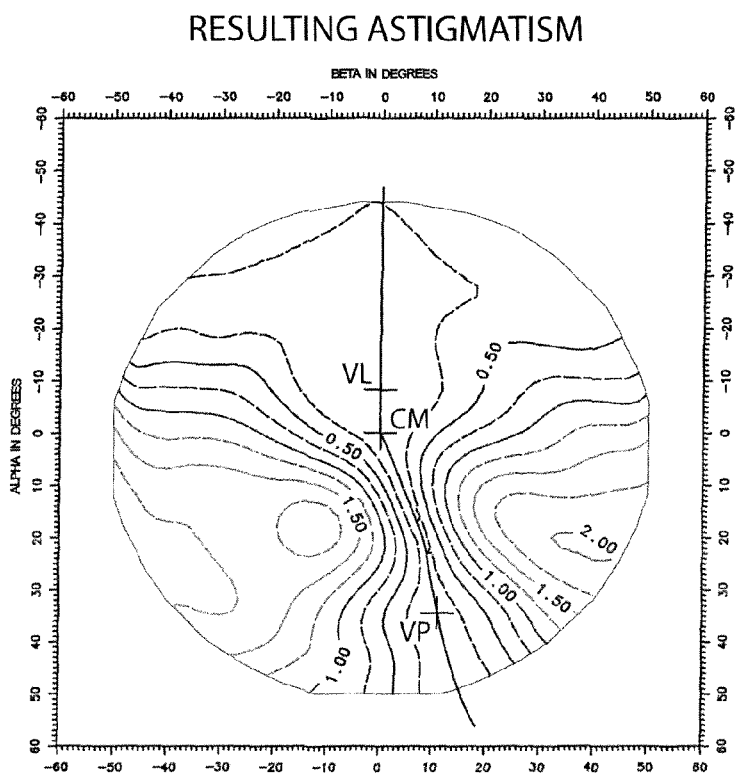

FIGS. 2b and 2c are optical analyses of the lens carried out for the optical power and for the resulting astigmatism, respectively. The ordinate and abscissa coordinates correspond to the angles of the viewing direction of the wearer with the optical axis Z of the lens 100, in a horizontal and vertical plane, respectively. These two angles are denoted by alpha and beta and expressed in degrees. In FIG. 2b, the curves indicated are iso-power curves, identified in diopters by the difference with respect to the power value at the distance-vision point VL. In FIG. 2c, the curves indicated correspond to points for which the value of astigmatism is constant, identified in diopters by the difference with respect to the prescribed value. For this reason, the astigmatism that appears in this figure is called resulting astigmatism and is substantially equal to zero along the trace that corresponds to the meridian line. The crosses that are indicated in these figures correspond to the viewing directions which respectively pass through the distance-vision points VL, through the mounting cross of the lens CM, and through the near-vision point VP.

The final lens in FIGS. 2b and 2c has been obtained starting from a semi-finished lens, whose front face S0 has a base value of 5.0, an addition of 2.0 diopters and a standard inset value of 2.5 mm (millimetres). The prescription for this lens is a correction of zero for the distance vision and an addition of 2.0 diopters. Its rear face S1 has been machined to give the lens an apparent inset value of 5 mm, corresponding to a horizontal angular shift of 11 degrees with respect to the distance-vision direction.

Figure 2D:
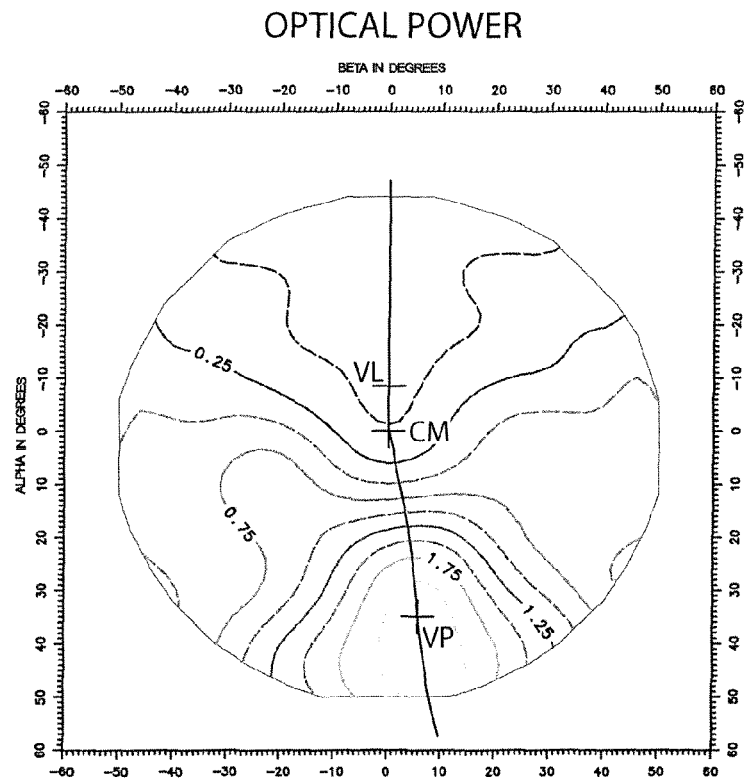
Figure 2E:
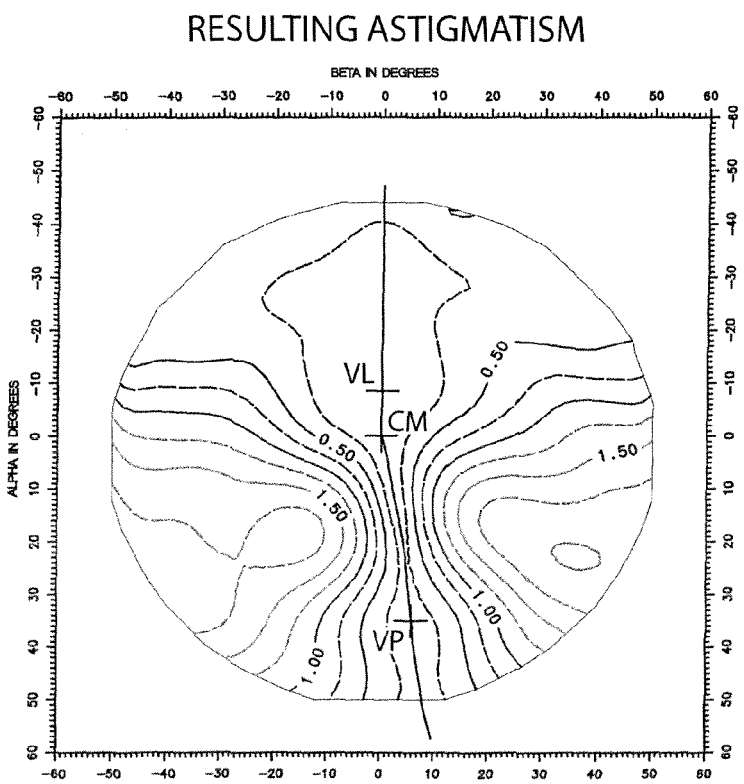

By way of reference, FIGS. 2d and 2e are contour maps of the optical power and of the resulting astigmatism of the semi-finished lens that has been used, when it is machined with a spherical rear face. The horizontal angular shift of the viewing direction for the near vision, with respect to the viewing direction for the distance vision, is 6 degrees in these figures, corresponding to the standard inset of 2.5 mm. The machining of the rear face 51 has therefore made it possible to obtain an apparent inset of 5 mm starting from a standard inset of 2.5 mm.

Figure 2F:
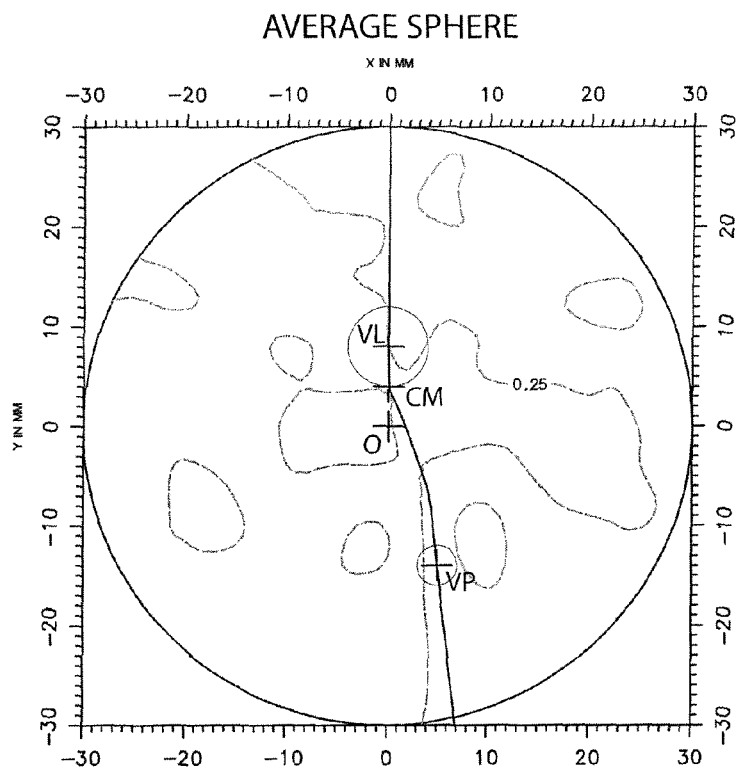
Figure 2G:
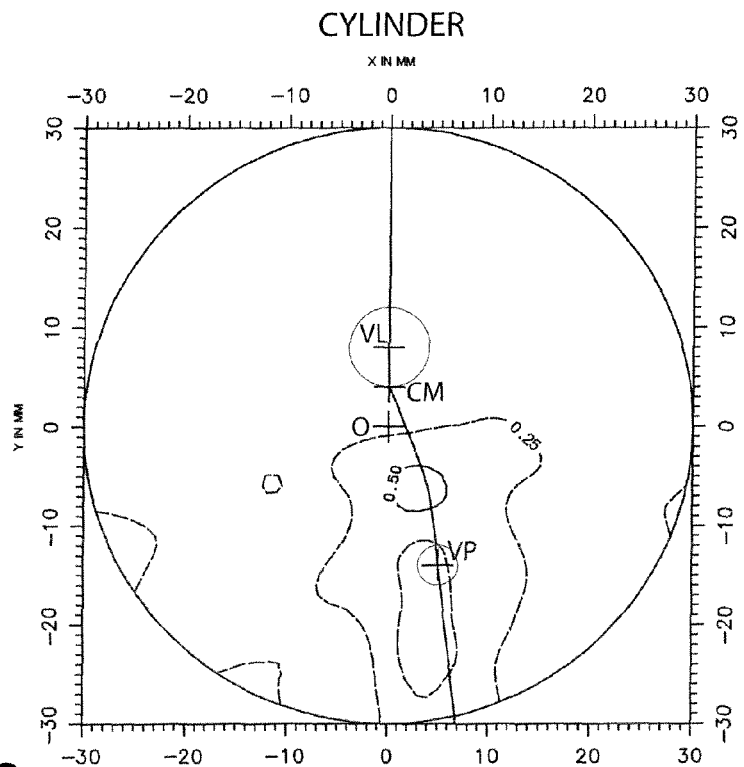

Lastly, FIGS. 2f and 2g are contour maps of the values of average sphere and of cylinder of the rear face S1 of the final lens, which has been machined according to the optimized trial virtual lens. The coordinates on the lens are marked out in millimetres along the axes X and Y, for the horizontal and vertical directions, respectively. In these two figures, the curves of average iso-sphere and of iso-cylinder respectively correspond to the values of 0.25 diopters (average sphere for FIG. 2f) and 0.25/0.50 diopters (cylinder for FIG. 2g).

Figure 5A:
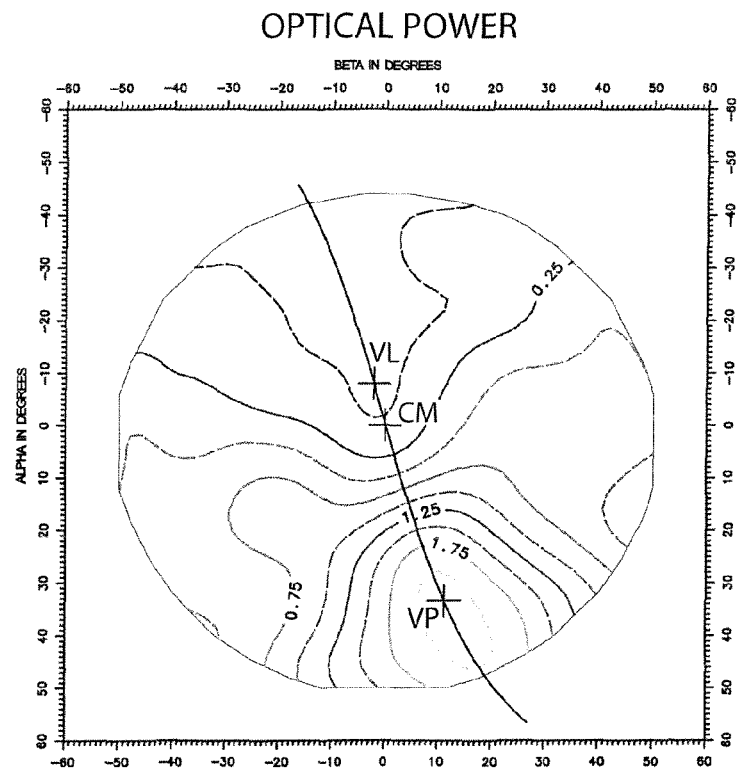
FIGS. 5a-5b are contour maps relating to a progressive addition lens with customized inset, manufactured using a method known from the prior art.
Figure 5B:
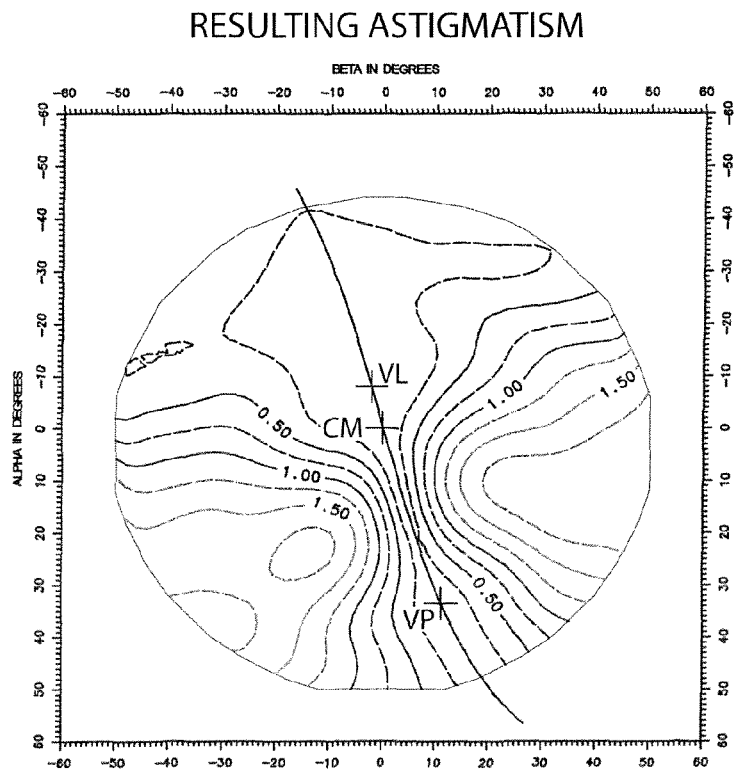

By way of comparison, FIGS. 5a and 5b are contour maps of optical power and resulting astigmatism for a progressive addition lens that has the same front face as the lens in FIGS. 2b-2g, and a simple rear face that corresponds to the prescription. The apparent inset value of 5 mm has been obtained by simply rotating the lens about its optical axis Z. The comparison between FIGS. 2b and 5a, together with that between FIGS. 2c and 5b, shows that the invention allows distance- and near-vision regions to be obtained that are distributed more symmetrically with respect to vertical planes passing through the distance-vision and near-vision points.

A second embodiment of the invention is described hereinafter, with reference to FIG. 3a. In this second embodiment, the step /b/ of the method of the invention, which consists in defining the target virtual lens, itself comprises the following three sub-steps:

/b1'/ apply by calculation a shear function to surface characteristics of the front face of the semi-finished lens, in such a manner as to obtain a modified virtual front face which has the progressive power addition of the semi-finished lens and the customized design feature value, the shear function being applied in a direction parallel to a horizontal direction in at least a part of the front face which is situated underneath the distance-vision point, with respect to a usage position of the ophthalmic lens;

/b2'/ optimize surface characteristics of the virtual front face modified by the shear function, with respect to target surface characteristics which correspond to the power addition of the semi-finished lens and to the customized design feature value. The first target virtual lens is then obtained; and /b3'/ define the target virtual lens, which is the second target virtual lens, by associating the front face modified by the shear function and optimized with a virtual rear face that has uniform values of average sphere and of cylinder, selected in such a manner that the target virtual lens corresponds to the prescribed vision correction.

This second embodiment of the invention has two main differences with respect to the first embodiment previously described:

the shear function is now applied digitally to surface characteristics of the front face of the semi-finished lens. This shear function may again be determined in the manner that has been described above for the first embodiment of the invention, in order to transform the meridian line. The virtual front face which is thus generated then has the customized design feature value which has been determined for the wearer, or a value close to the latter;

the surface characteristics of the front face that are thus obtained are then optimized, notably in order to reduce discontinuities in curvature and the presence of undesirable differences of values of cylinder within certain regions of this face.

The target virtual lens is then formed by this optimized front face, which is combined with a simple rear face corresponding to the prescription.

The optimization of the trial virtual lens, with respect to the optical characteristics of the target virtual lens, is then identical to that described for the first embodiment of the invention. The rear face of the lens which is obtained as a result of the optimization of the trial virtual lens, according to the second embodiment of the invention, can still be produced.

Figure 3B:
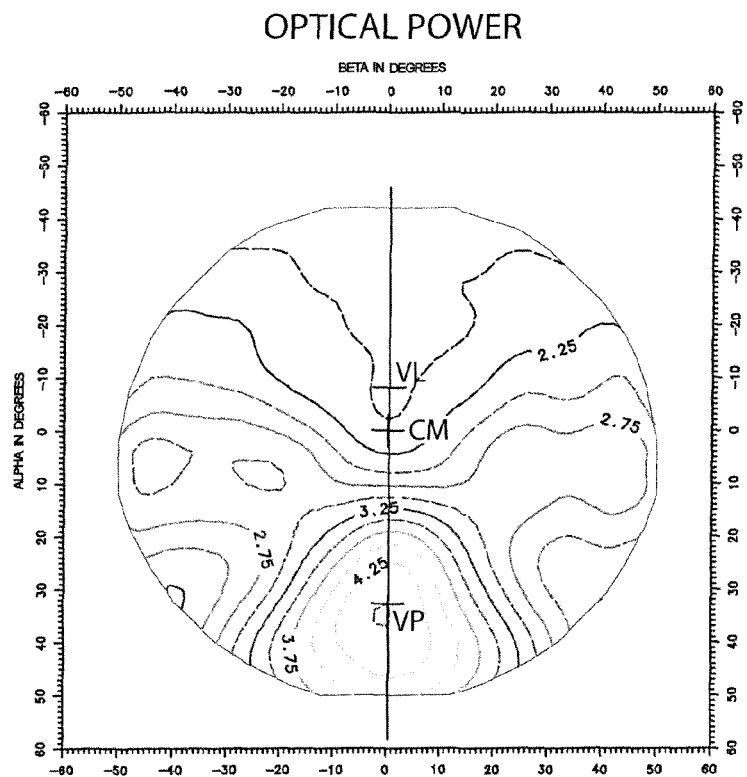
Figure 3C:
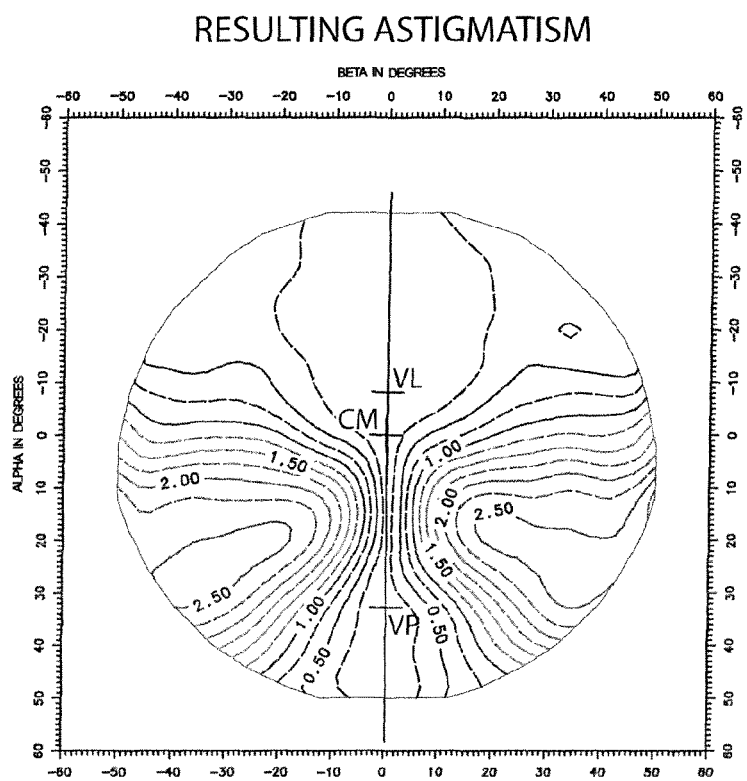
Figure 3D:
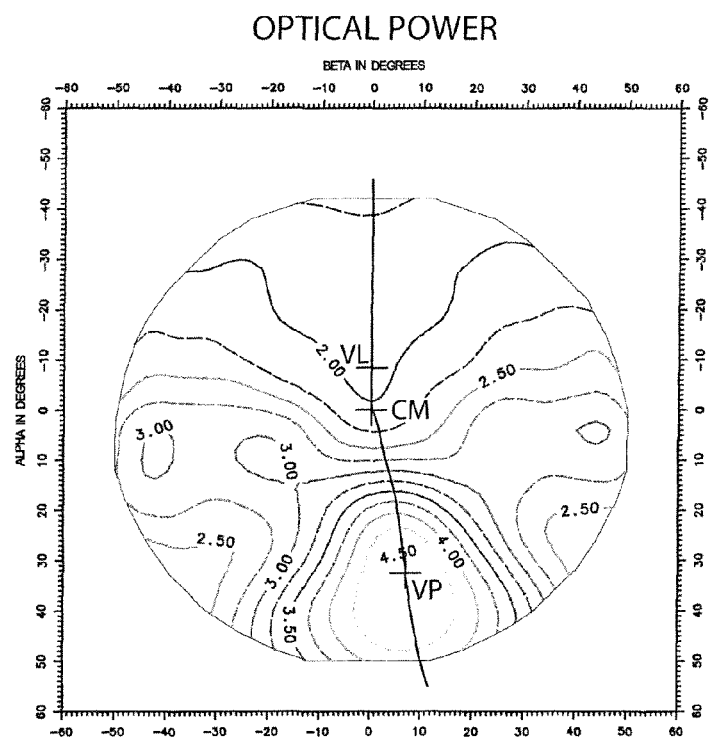
Figure 3E:
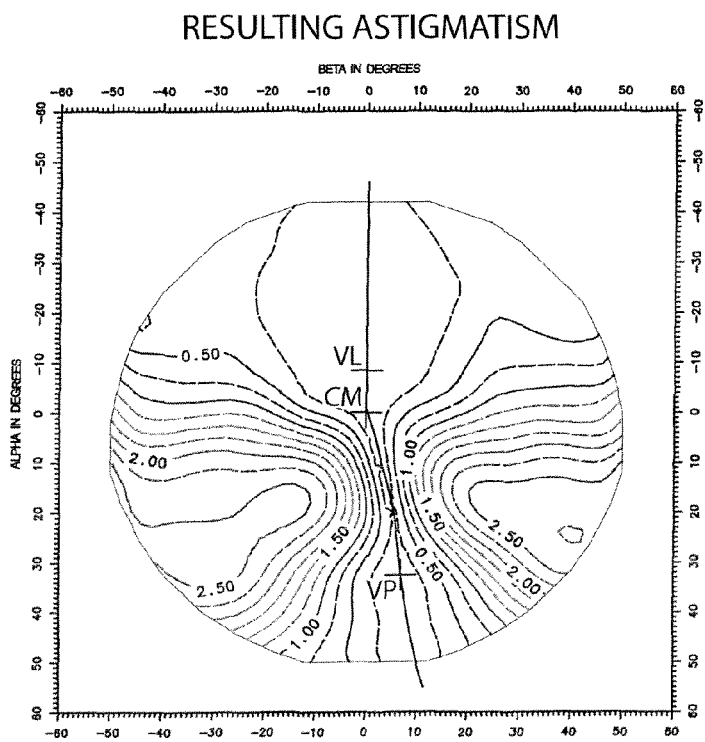
Figure 3F:
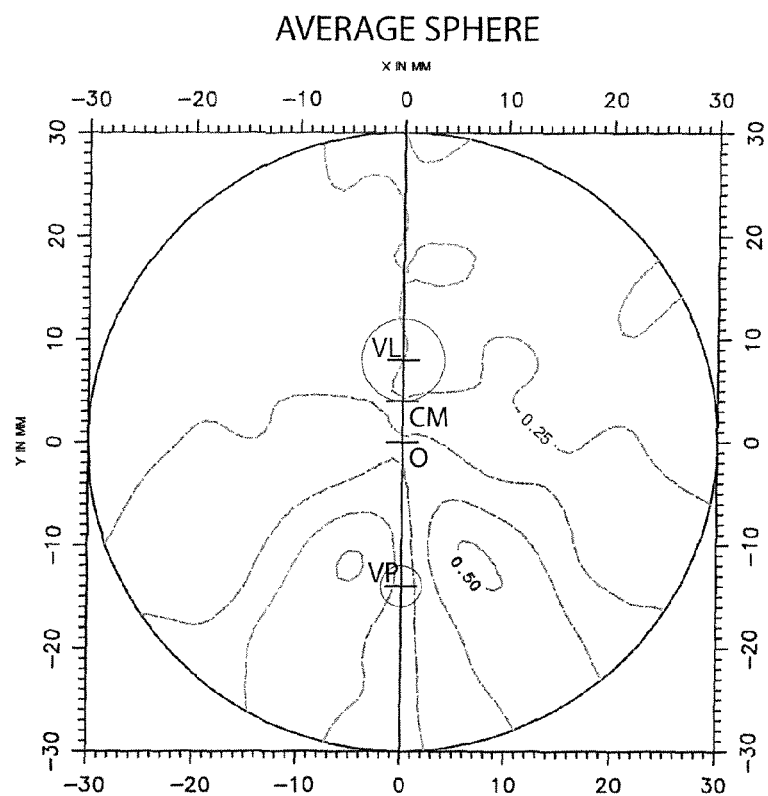
Figure 3G:
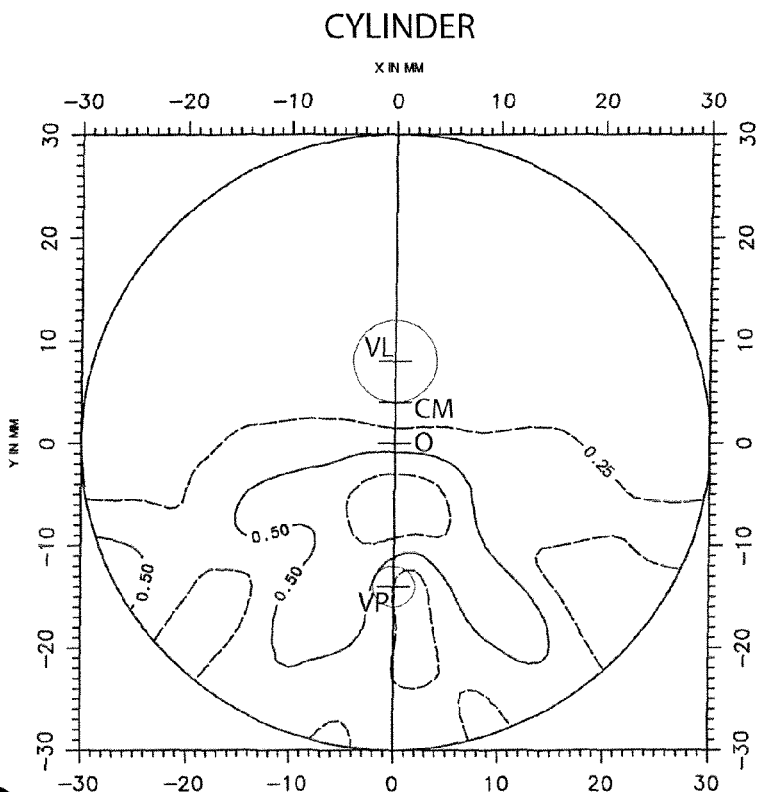

FIGS. 3b-3g illustrate this second embodiment of the invention, where the inset is the design feature to be customized, in the same manner as in FIGS. 2b-2g for the first embodiment:

FIGS. 3b and 3c: contour maps of the optical power and of the resulting astigmatism of the final lens;

FIGS. 3d and 3e: contour maps of the optical power and of the resulting astigmatism of the semi-finished lens, when the rear face is of simple shape and corresponds to the prescription; and FIGS. 3f and 3g: contour maps of the average sphere and of cylinder of the rear face machined according to the second embodiment of the invention.

Figure 3H:
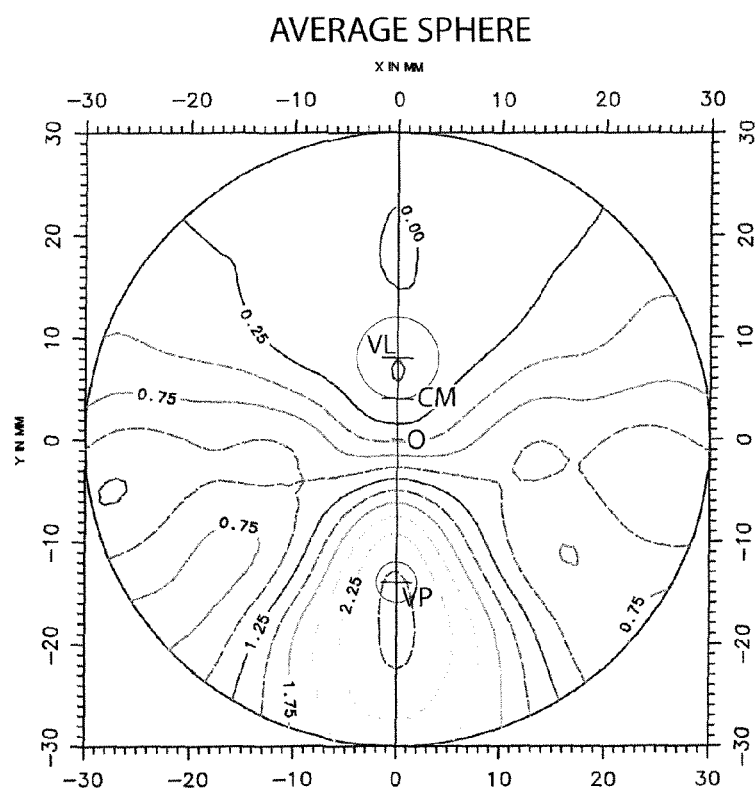
Figure 3I:
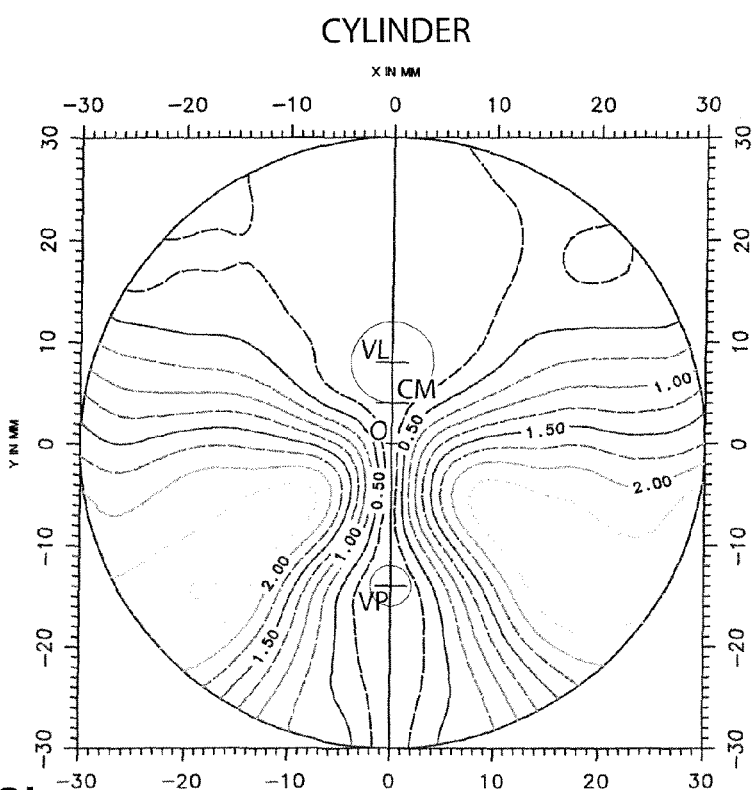
Figure 3J:
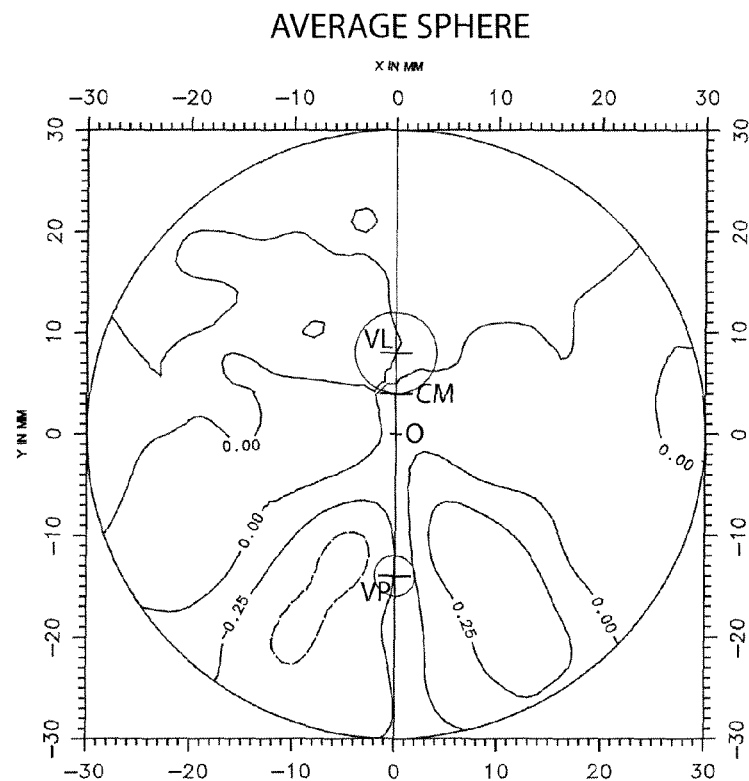
Figure 3K:
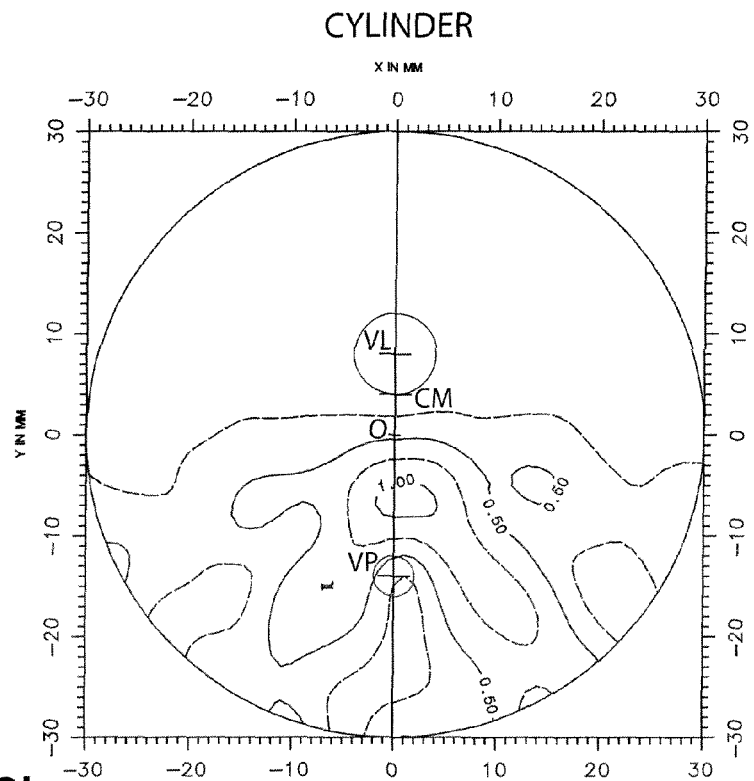

In addition:

FIGS. 3h and 3i are contour maps of the average sphere and of cylinder of the rear face of the target virtual lens that are obtained at step /b/ of this second embodiment; and FIGS. 3j and 3k are contour maps of the average sphere and of cylinder of the initial rear face of the trial virtual lens that are obtained according to one improvement of the invention that will be presented later.

In this example, the prescription for the lens corresponds to an optical power of +2.0 diopters in distance vision, without correction for astigmatism. The rear face S0 of the semi-finished lens has the following characteristics: base of 6.0, addition equal to 2.5 diopters and standard inset of 3.3 mm, corresponding to a horizontal angular shift of the direction of near vision of 7 degrees. The rear face S1 has been determined in such a manner as to obtain an apparent inset value of 0 mm, corresponding to a viewing direction for the near vision which is situated in the same vertical plane as for the distance vision. In addition, FIGS. 3h and 3i are contour maps of the average sphere and of cylinder of the front face of the target virtual lens, obtained after the optimization of the surface characteristics of the front face with customized inset value.

A third embodiment of the invention is described with reference to FIG. 4a, in which step /b/ of the method of the invention itself comprises the following three sub-steps:

/b1"/ obtain at least two reference front faces that correspond to two respective design feature values;

/b2"/ calculate the front face of the target virtual lens by mixing these two reference front faces, in such a manner as to obtain a mixed front face having the customized design feature value. The first target virtual lens is then obtained; and /b3"/ define the target virtual lens which is the second target virtual lens by associating the mixed front face with a virtual rear face that has uniform values of average sphere and of cylinder, selected in such a manner that the target virtual lens corresponds to the prescribed vision correction.

This third embodiment of the invention differs from the second in the manner of generating digitally the front face of the target virtual lens. Instead of using a shear function, this front face is obtained by mixing two reference faces that have different design feature values. In a known manner, such a mixing can be performed by characterizing each face by its sagittal values at the points of a common mesh defined on the latter. The sagittal values of the two reference faces are then added together, for each point of the mesh, weighting them by weighting coefficients that are adapted so that the resulting front face has the customized design feature value. Preferably, the two reference faces can each correspond to the addition value that is prescribed for the wearer, or each have an addition value that is close to that prescribed. The sum of the two weighting coefficients that are respectively assigned to the two reference faces, for the same point of the mesh, can be equal to unity. These coefficients could also vary between different points of the mesh, in order to modify the importance of one of the two reference faces in the mixture, in certain regions of the front face of the lens.

Practically speaking, one of the two front reference faces which is obtained at step /b1"/ can be the front face S0 of the semi-finished lens which is obtained at step /a/. The other front reference face can then have an design feature value that is higher or lower than the front face of the semi-finished lens, depending on the customized design feature value that has been determined for the wearer.

FIGS. 4b-4g illustrate this third embodiment of the invention where the inset is the design feature to be customized, again in the same manner as FIGS. 2b-2g for the first embodiment. In this new example, the prescription of the lens corresponds to an optical power of +4.0 diopters for distance vision, without correction for astigmatism.

Figure 4H:
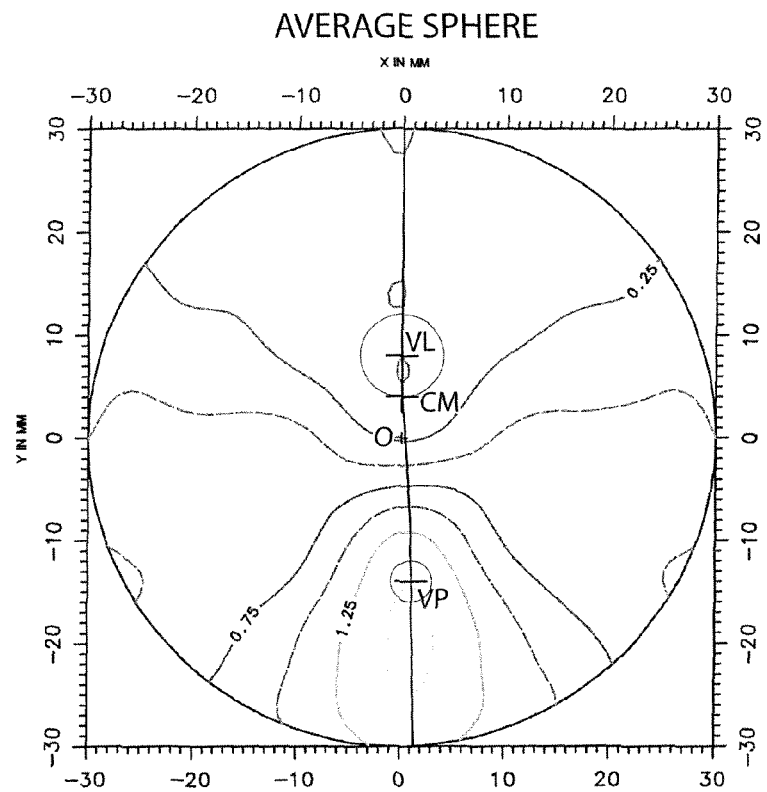
Figure 4I:
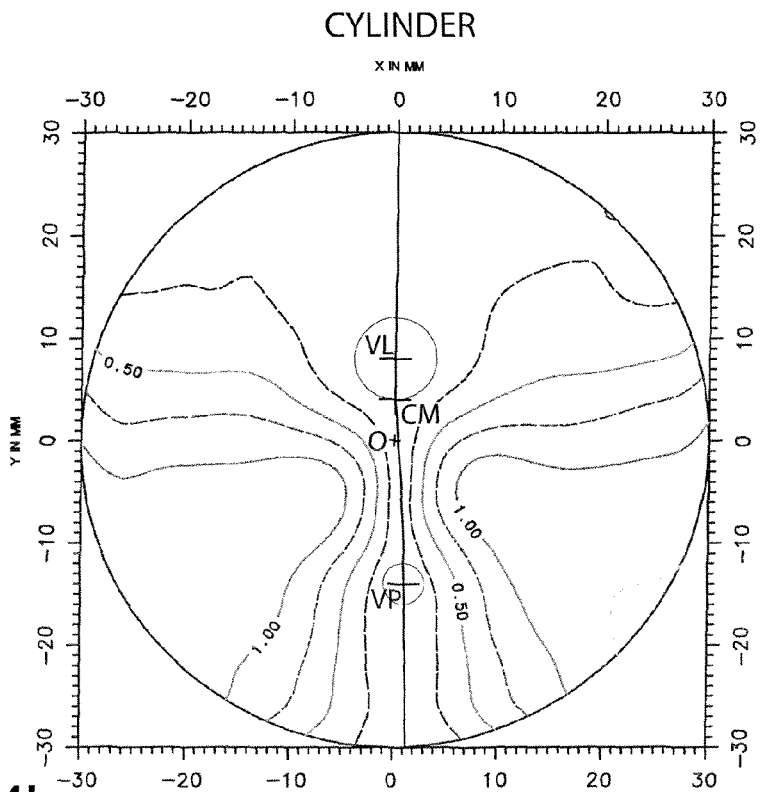

The front face of the semi-finished lens has the following characteristics: base of 7.25, addition equal to 1.5 diopters and standard inset of 3.0 mm, corresponding to a horizontal angular shift in the near-vision direction of 6.5 degrees. The rear face S1 has been determined in such a manner as to obtain an apparent inset value of 0 mm, corresponding to a viewing direction for the near vision that is situated in the same vertical plane as the viewing direction for the distance vision. The mixed front face has been obtained by mixing two reference front faces of base 7.25 and of addition 1.5 diopters, having respective inset values of 3.0 mm and 0.0 mm, so as to obtain a resulting surface of inset 1.0 mm. The coefficients of the mixture are respectively ⅓ and ⅔. FIGS. 4h and 4i are contour maps of average sphere and of cylinder of the front face of the target virtual lens after the mixing of the reference faces.

According to a first improvement of the invention, the target virtual lens can be defined with a base value of the front face different from the base value which would be selected for the semi-finished lens, depending on the vision correction prescribed. In this way, optical aberrations of the final addition lens can be minimized.

According to a second improvement of the invention, the optimization of the trial virtual lens with respect to the target virtual lens can be carried out by initially assigning to the trial virtual lens a rear face which is the result of a subtraction between the front face of the semi-finished lens S0 and the front face of the target virtual lens, with respect to the uniform values of average sphere and of cylinder. In this way, the optimization is faster. In a usual manner for those skilled in the art, a subtraction of surfaces denotes an operation for the combination of two initial surfaces so as to obtain a third from them, by which a sagittal value (or 'sag value') of the second surface is subtracted from that of the first surface, at each point of a projection of the surfaces onto a base plane, and the third surface is defined by assigning the result of the subtraction as a new sag height at the same point. In particular, when the optimization is performed iteratively using a merit function to measure the difference between the trial virtual lens obtained with each iteration and the target virtual lens, the optimization requires a smaller number of iterations to achieve the same value for the merit function. FIGS. 3j and 3k are initial contour maps of average sphere and of cylinder of the initial rear face of the trial virtual lens, thus determined.

Embodiments of the present invention propose taking into account the shape and the size of the frame in order to retain the distribution between the far-vision, near-vision and intermediate-vision zones on the lens and are described in view of FIGS. 6 to 10. A given design of a progressive ophthalmic lens is used, a spatial transformation is applied which retains the power and resulting astigmatism defect values but shifts these values on the surface of the lens in order to spread or close up the power and astigmatism gradients. Thus, in the case of a small frame, the gradients can be closed up in order to guarantee the presence of a minimum surface of the near-vision zone and in the case of a large frame, the gradients can be spread in order to clear the vision fields and in order to improve peripheral vision.

The present embodiment of the invention proposes a method for manufacturing a progressive ophthalmic lens for a presbyopic wearer, i.e. for whom a power addition (Add) has been prescribed for near vision. The embodiments of the invention makes it possible to manufacture a progressive ophthalmic lens guaranteeing for the wearer good accessibility to the near-vision zone and an improved dynamic vision in the entire vision field whatever the type of frame chosen and its prescription.

In a manner known per se, a progressive lens has a far-vision zone with a control point FV, a near-vision zone with a control point NV and an intermediate-vision zone. The lens has a substantially umbilical line, called a principal progression meridian crossing these three zones, over which the astigmatism is practically nil. The meridian coincides with the vertical axis in the upper part of the lens and can have an inclination on the nose side in the lower part of the lens, the convergence being more marked in near vision. The lateral shift of the control point NV relative to the vertical axis of the meridian in the upper part of the lens is called an inset.

The meridian therefore has a power progression between the control point in far vision FV and the control point in near vision NV; this progression corresponds approximately to the value of the addition prescribed. A fitting cross CM is marked by a reference point on the complex surface and constitutes an aid for fitting the cut-out lens into the frame; this fitting cross CM makes it possible to locate on the lens the primary direction of viewing under wearing conditions. In this context, progression length PL refers to the vertical distance between the fitting cross CM and the point of the meridian in near vision NV at which the power progression reaches the prescribed power.

The progression length PL defines the accessibility to the powers necessary in near vision. In fact, the profile of the meridian represents the wearer power as a function of lowering the eyes in the eye sockets with a direction of viewing which is straight ahead. Thus, according to the value of the progression length, the wearer will have to lower his eyes more or less in order to be able to take full advantage of the near-vision zone. With a constant progression length, the near-vision zone can be substantially present on the cut-out lens depending on the size and the shape of the frame.

The embodiments taking into account the size and the shape of the frame in order to optimize a progressive ophthalmic lens afford optimal visual comfort for the wearer. The consideration of such frame parameters is now possible on an industrial scale thanks to the methods for direct machining of the complex surfaces constituting the progressive lenses.

For this purpose parameters representing the frame chosen by the wearer are measured as explained below with reference to FIGS. 6 and 7; then an initial design of a progressive lens is chosen. This design establishes an initial distribution of power and resulting astigmatism defect targets for each direction of viewing under wearing conditions in a standard size frame. The design chosen can correspond to any design of a known or future progressive lens, for example the initial distribution of the power and resulting astigmatism defect targets can correspond to a Varilux Comfort® or Varilux Panamic® lens.

Figure 6:
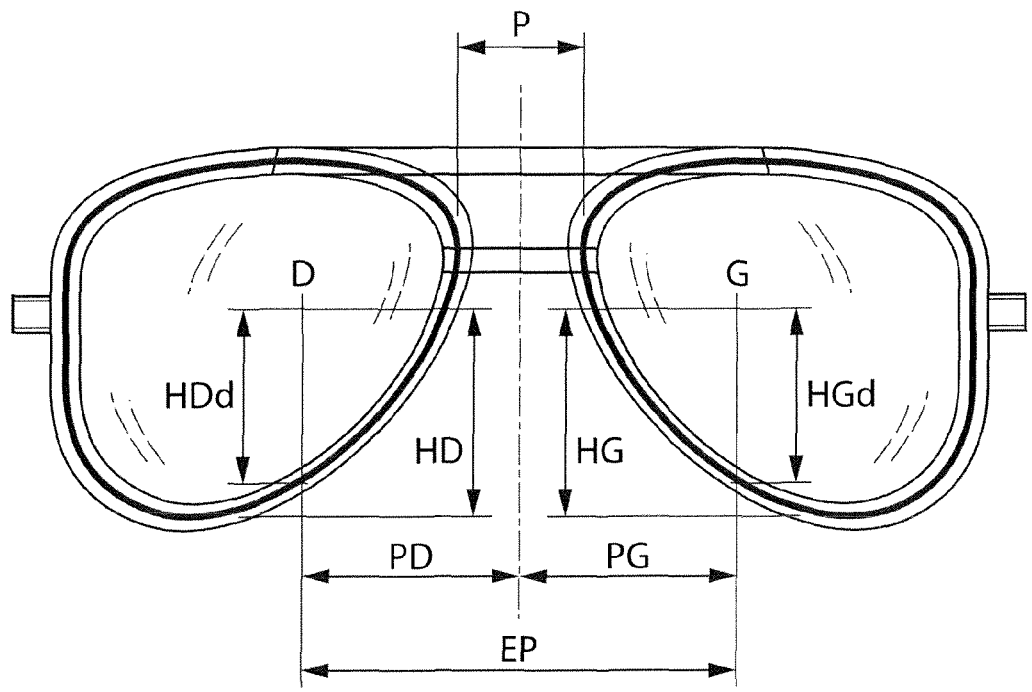
FIG. 6 is a diagram of an ordinary frame.
Figure 7:
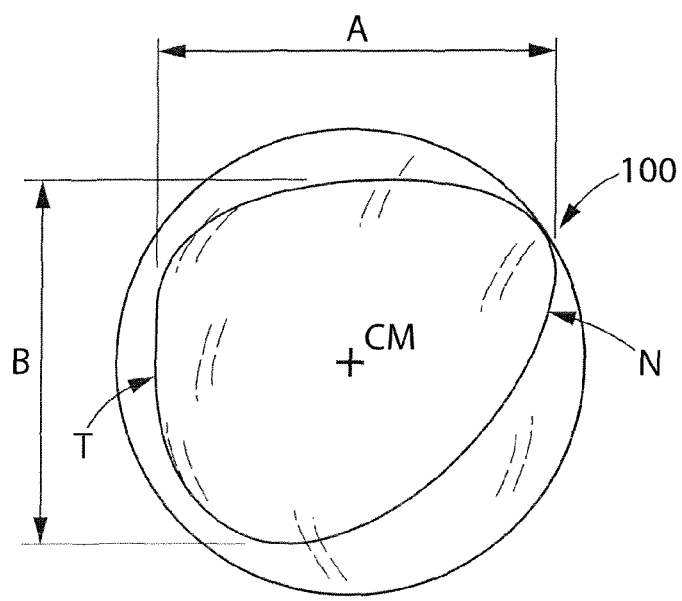
FIG. 7 is a diagram of a lens before and after cutting out for insertion into a frame of FIG. 6.

FIG. 6 shows a diagram of a frame and FIG. 7 diagrammatically illustrates a lens before and after cutting out.

The wearer chooses a frame. The optician measures the physiological parameters of the wearer for the chosen frame. FIG. 6 shows a representation of a frame and the position of the right and left pupils of the wearer in the frame, which are respectively referenced D and G. The figure shows for the frame the contour of the lens in thick lines, and in thin lines the internal and external limits of the frame. An element, made of plastic or another material, the contour of which corresponds to the bottom of the groove of the frame, is called the template of the frame. The template is therefore the external shape that the lens must have once cut out in order to fit in the frame. The letter B designates the total height of the template determined with the Boxing system, i.e. according to the IS08624 standard on systems for the measurement of lenses frames. This height corresponds to the height of a rectangle into which the lens fits once it is cut out. In the case of a drilled frame, without any template, it is the height B of the cut-out lens (FIG. 7) which is considered. An element connecting the right and left templates of the frame is called the bridge of the frame, referenced by letter P in FIG. 6. The bridge P can also be a rod connecting drilled right and left lenses.

Interpupillary distance EP refers to the distance between the two pupils of the wearer. For the fitting of progressive lenses, an optician measures the right interpupillary half-distance and the left interpupillary half-distance, which are referenced PD and PG. The left half-distance (respectively right) is the distance between the vertical axis of symmetry of the frame and the centre of the left pupil (respectively right). Right boxing height HD (respectively left boxing height HG) refers to the vertical distance between the right pupil (respectively left) and the lowest point of the right half-frame (respectively left height). For the fitting of progressive lenses, the optician then measures the DATUM heights referenced HDd and HGd in FIG. 6. These right and left reference heights are respectively the distances between the right or left pupil and the right or left intersection between a vertical line passing through the pupil and the frame in its lower part. The measurements of interpupillary distance and of height of the pupil relative to the frame are carried out for a given position of the wearer, namely for the wearer looking at infinity with his head straight.

The features of a given frame can be measured on the frame, using a device known per se. By way of example, U.S. Pat. No. 5,333,412 describes a device which makes it possible to measure in 3-dimensions, the shape of the bottom of the groove of the frame. The shape thus determined then makes it possible to calculate the height B. The features of a frame can also be given directly by the manufacturer according to the model chosen by the wearer.

Using the data thus defined, each lens is cut out such that the fitting cross CM is situated in the frame facing the pupil of the corresponding eye, when the wearer looks at infinity with his head straight. Consequently, when the wearer of the frame looks at infinity with his head straight, his viewing passes through the lens at the fitting cross. It is of course possible, if the fitting cross is not marked on the lens, to use the medium of the micro-marks for positioning the lenses, after correction by the distance between this medium and the fitting cross.

FIG. 7 shows a representation of the contour of an ophthalmic lens, before and after cutting out. In the figure, the thin line corresponds to the contour of the lens before cutting out; in a standard manner, the lens can be obtained by moulding and has a circular shape. The thick line corresponds to the contour of the template of the frame, which is also the contour of the lens after cutting out the lens. This cutting out of the lens allows the subsequent fitting of the lens in the frame.

FIG. 7 shows the total width A of the template of the frame and the total height B of this template, i.e. the width and the height of the rectangle into which the cut-out lens fits. As explained above, the positioning of the lens in the frame consists in determining the desired position of the lens in the frame, using notable points of the lens. For example, the fitting cross of the lens, the medium of micro-marks marked on the surface of the lens, or also the optical centre in the case of a unifocal lens can be used. In FIG. 7, the fitting cross is marked by the cross referenced CM. For a lens which does not have a rotational symmetry, it is also necessary to carry out an angular positioning of the lens in the frame. This angular positioning depends on the manufacturer's specifications, and in particular for progressive lenses on the behaviour of the principal progression meridian; in the progressive lenses of the applicant, the principal progression meridian is inclined on the temporal side towards the nose side, and the lens must be fitted in such a way that the micro-marks are horizontal. In the state of the art lenses have also been proposed having a straight principal progression meridian, which are inclined towards the nose side when fitting.

A given frame, chosen by a given wearer, can thus be characterized by a certain number of parameters representing its size and its shape. Notably, it is possible to define a vertical parameter, referenced B', depending on the fitting height measured HD, HG or HDd, HGd according to the measurement system chosen. For example it is possible to use as vertical parameter B', the measured variable HD (HG). It is also possible to define a horizontal parameter taking into account the total width A of the template of the frame (or of the cut-out lens), the width of the bridge P and the interpupillary distance measured EP. For example it is possible to use as horizontal parameter A', the variable defined as follows:

$$A'=A+0.5*(P-EP).$$

This variable can be calculated for each eye:

$$A'd=A+0.5*P-PD, \text{ and}$$

$$A'g=A+0.5*P-PG$$

In this context, standard parameters are defined as the average value of the horizontal and vertical parameters as defined above for a representative sample of frames and for the average of wearers. According to the definitions of the parameters given above, a standard vertical parameter B'av would be equal to the average fitting height value HDav, equal to 21.6 mm. This average fitting height value is calculated from 5600 prescriptions collected between November 2003 and April 2004 in Europe. Similarly, a standard horizontal parameter A'av would be defined as follows:

$$A'av=Aav+0.5*(Pav-EPav).$$

With Aav, the average width of frame template, equal to 51.6 mm, this being calculated from 5600 prescriptions collected between November 2003 and April 2004 in Europe;

Pav, the average length of a bridge of a frame, equal to 18.4 mm, this being calculated using 5600 prescriptions collected between November 2003 and April 2004 in Europe;

EPav, the average interpupillary distance, generally set at 62 mm.

From the frame chosen by the wearer, transformation coefficients are then calculated. The calculation of these transformation coefficients takes into account the parameters measured representing the frame chosen and standard parameters as defined above.

According to one embodiment, the transformation coefficients include a horizontal coefficient $\gamma$ and a vertical coefficient $\delta$. The vertical transformation coefficient $\delta$ can be defined as the ratio between the vertical parameter B' calculated for the frame chosen by the wearer and the standard vertical parameter B'av. Similarly the horizontal transformation coefficient $\gamma$ can be defined as the ratio between the horizontal parameter A' calculated for the frame chosen by the wearer and the standard horizontal parameter A'av.

According to one embodiment, only the vertical transformation coefficient $\delta$ can be calculated and the horizontal coefficient $\gamma$ is then set equal to the vertical coefficient $\delta$. This embodiment makes it possible to limit the distortions of the design of the lens by applying a symmetrical spatial transformation to the distribution of the power and resulting astigmatism defect targets on the lens personalized for the chosen frame. The vertical transformation coefficient $\delta$ makes it possible to adapt the design of the lens to the height of the frame chosen and in particular to guarantee the presence of a minimal near-vision zone.

The vertical $\delta$ and/or horizontal $\gamma$ transformation coefficients can be limited in order to avoid too high or too low a gradient of resulting astigmatism which would lead to a reduced field effect or to an increased pitching effect. For example, the vertical transformation coefficient $\delta$ can be limited to a lower value equal to 0.65 and to an upper value equal to 1.5. The lower limit of the vertical transformation coefficient $\delta$ is set by a physical limit which corresponds to a minimum achievable progression length value. The upper limit of this coefficient is in particular imposed by the necessity to not extend the progression length too much in order to preserve good accessibility to the near-vision zone. This limitation is "mechanical", due to the eye lids and corresponds to a maximum lowering of viewing with a fixed head. Similarly, the horizontal transformation coefficient $\gamma$ can be limited to a lower value equal to 0.5 which ensures the preservation of a minimal acuity zone, and to an upper value equal to 1.25. This upper limit corresponds to the maximal temporal rotation of the eyes; this is also a "mechanical" limit. In the above-mentioned embodiment according to which the horizontal and vertical transformation coefficients are not set equal, the ratio $\delta/\gamma$ of the vertical coefficient $\delta$ to the horizontal coefficient $\gamma$ is limited to a lower value equal to 0.5 and to an upper value equal to 3.0 in order to avoid too large distortions of the distribution of the power and resulting astigmatism defect targets.

A personalized distribution of the power and resulting astigmatism defect targets can then be calculated in order to optimize the lens intended for the frame chosen by the wearer. The transformation coefficients calculated as explained above are applied to the initial distribution chosen for the power and resulting astigmatism defect targets in order to spatially shift these targets in order to adapt the design chosen to the size and shape of the frame. The transformation coefficients $\gamma$ and $\delta$ are applied to the coordinates of the targets on the surface of the lens and not to the values of the targets. The design chosen therefore undergoes a compression or an expansion depending on whether the frame chosen is smaller or larger than that of a standard frame. The embodiment of the method of the invention proposes applying a spatial transformation to a given design for distribution of the power and resulting astigmatism defect targets, the transformation ratio being a function of the size and the shape of the frame chosen relative to standard frame parameters. The design is therefore not modified but simply expanded or compressed, in particular the values of the targets are not recalculated but simply shifted spatially on the surface of the lens.

The calculation of the personalized distribution of the power and resulting astigmatism defect targets on the lens intended for the frame chosen by the wearer can be carried out in the following way. A vertical and horizontal mesh is defined by associating a point to each direction of viewing under wearing conditions. Spherical coordinates (β, α) corresponding to the intersection of a line of viewing on the aspherical surface of the lens for each direction of viewing are associated with each point of this mesh. A power defect value and a resulting astigmatism value corresponding to the initial distribution chosen for the targets are also associated with each point of the mesh. The transformation coefficients γ and δ are then applied to each point of the mesh thus defined; the spherical coordinates of each point are recalculated by multiplying the angular value β and/or α by the corresponding homothetic coefficient γ and/or δ and by maintaining the power and resulting astigmatism defect target values constant. For example, the application of the calculated transformation coefficients γ, δ to the spherical coordinates (β, α) can consist in multiplying the vertical angular value α by the vertical transformation coefficient δ, and multiplying the horizontal angular value (β-βmer) by the horizontal transformation coefficient γ, βmer being for a given α the value of the abscissa of the point on the meridian. In this way the inset VP is not modified by the transformation.

In addition to the limits imposed on the values of the horizontal γ and vertical δ transformation coefficients, as described above, it is also possible to impose, during calculation of the personalized distribution of the targets, maintaining constant the ratio of the area of the surface of the lens for which the resulting astigmatism defect is less than or equal to 0.5 diopters over the total surface of the cut-out lens. Thus a constant proportion of the distribution between the far-vision, near-vision and intermediate-vision zones is guaranteed whatever the size and the shape of the frame chosen by the wearer.

Figure 8B:
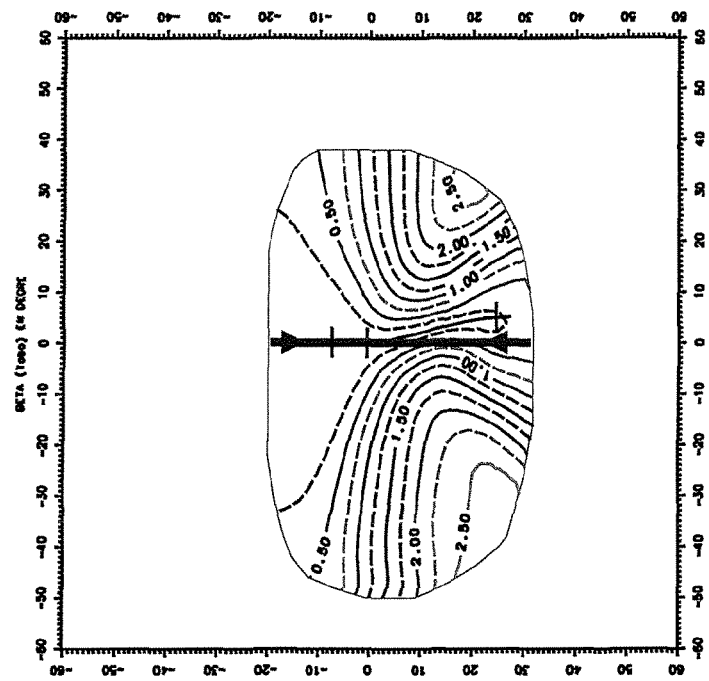
FIGS. 8a and 8b are maps of resulting astigmatism for a lens of the prior art and for a lens according to an embodiment of the invention respectively.
Figure 8A:
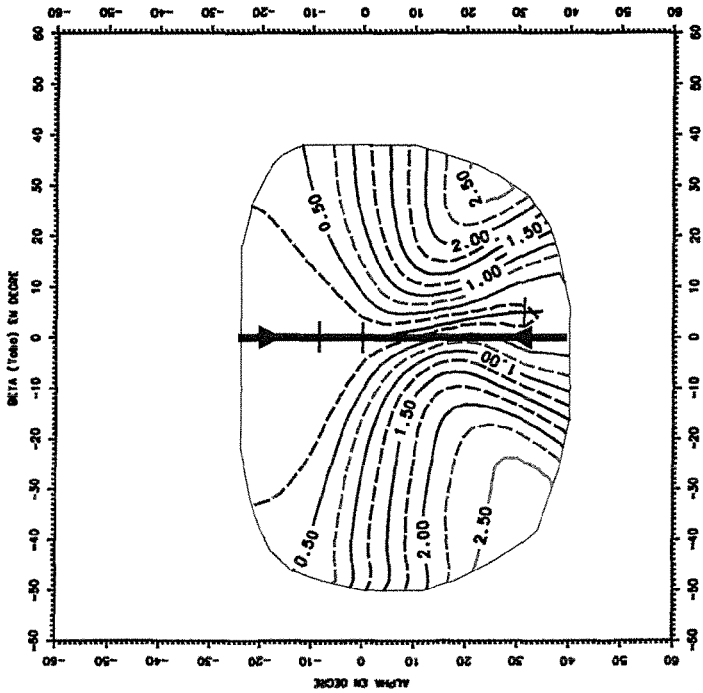

FIGS. 8a and 8b show one embodiment of a progressive ophthalmic lens manufactured by an embodiment of the invention. FIG. 8a shows an all-purpose cut-out lens having a distribution of resulting astigmatism targets determined under wearing conditions with standard wearer and frame parameters. FIG. 8b shows a cut-out lens specifically adapted for the choice of a frame of low height. The distribution of the resulting astigmatism targets on the lens of FIG. 8b is defined by affinity of the horizontal axis and vertical direction of the initial distribution of FIG. 8a. A vertical compression coefficient δ (affinity ratio) is applied to each point (β, α) of the initial lens which shifts the value of the resulting astigmatism towards another point (β, α') of the personalized lens. Such a vertical compression in particular guarantees that the near-vision zone is in fact present on the lens even when the wearer chooses a frame with a very small height.

Figure 9B:
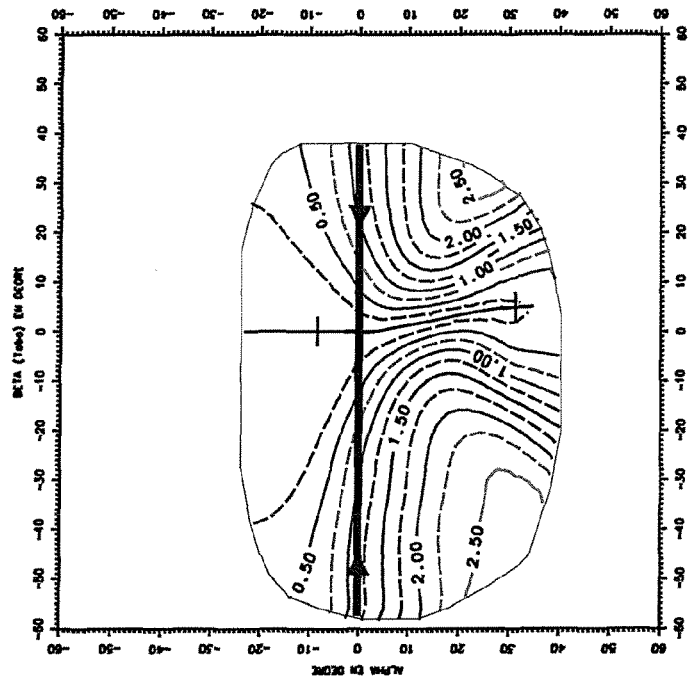
FIGS. 9a and 9b are maps of resulting astigmatism for a lens of the prior art and for a lens according to an other embodiment of the invention respectively.
Figure 9A:
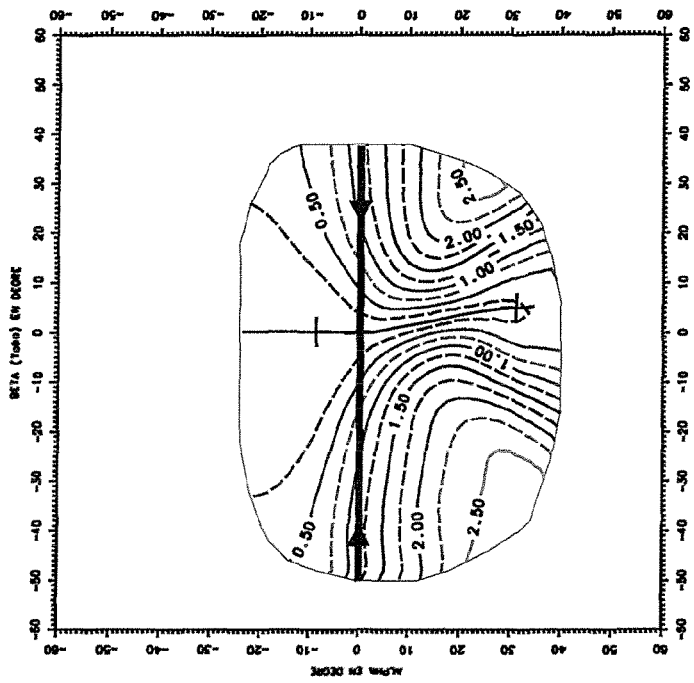

FIGS. 9a and 9b show another embodiment of a progressive ophthalmic lens manufactured according to the present embodiment. FIG. 9a shows the all-purpose cut-out lens of FIG. 8a and FIG. 9b shows a cut-out lens specifically adapted for the choice of a wide frame. The distribution of the resulting astigmatism targets on the lens of FIG. 9b is then defined by horizontal transformation of the initial distribution of FIG. 9a. At each point (β, α) of the initial lens a horizontal expansion coefficient γ is applied which shifts the value of the resulting astigmatism towards another point (β', α) of the personalized lens. Such a horizontal expansion provides a broader field perception for an improved peripheral vision when the wearer chooses a very wide frame.

Figure 10B:
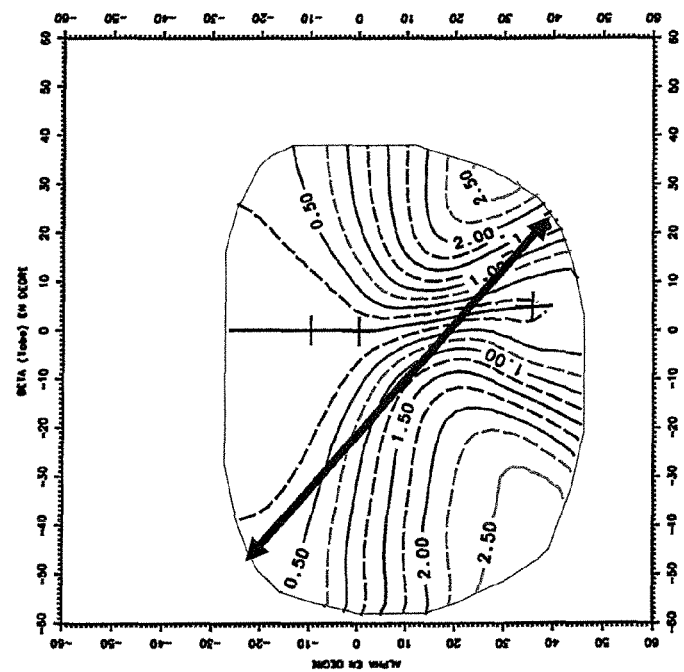
FIGS. 10a and 10b are maps of resulting astigmatism for a lens of the prior art and for a lens according to an other embodiment of the invention respectively.
Figure 10A:
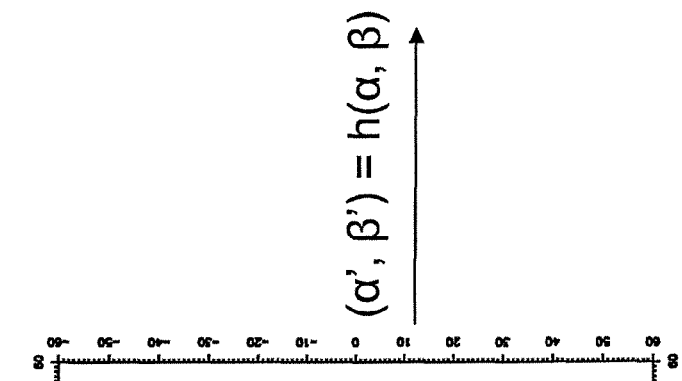

FIGS. 10a and 10b show another embodiment of a progressive ophthalmic lens manufactured according to an embodiment of the invention. FIG. 10a shows the all-purpose cut-out lens of FIGS. 8a and 9a and FIG. 10b shows a cut-out lens specifically adapted for the choice of a frame with large dimensions. The distribution of the resulting astigmatism targets on the lens of FIG. 10b is then defined by horizontal and vertical transformation of the initial distribution of FIG. 10a. At each point (β, α) of the initial lens a horizontal expansion coefficient γ and a vertical expansion coefficient δ are applied which shift the value of the resulting astigmatism towards another point (β', α') of the personalized lens. Such a two-dimensional expansion provides a broader field perception for an improved peripheral vision and clears the fields in far vision or an improved dynamic vision when the wearer chooses a frame with very large dimensions.

Although only the resulting astigmatism maps are illustrated, it is understood that the embodiments of the invention also allow manufacturing a lens with a personalized distribution of the power defect targets at the same time as the personalized distribution of the resulting astigmatism. It is also understood that the method of these embodiments allows other embodiments than those illustrated, for example a two-dimensional compression.

These embodiments therefore make it possible to manufacture a progressive ophthalmic lens by optical optimization using the distribution of the targets calculated as a function of the frame chosen by the wearer. The power required at each point of the lens can then be calculated by optical optimization under wearing conditions, by successive iterations in order to obtain the target power defect and the target astigmatism defect for each direction of viewing.

The lens according to the said embodiments, thus obtained, therefore better satisfies the needs of the wearer and provides him with better visual comfort.

Figure 11:
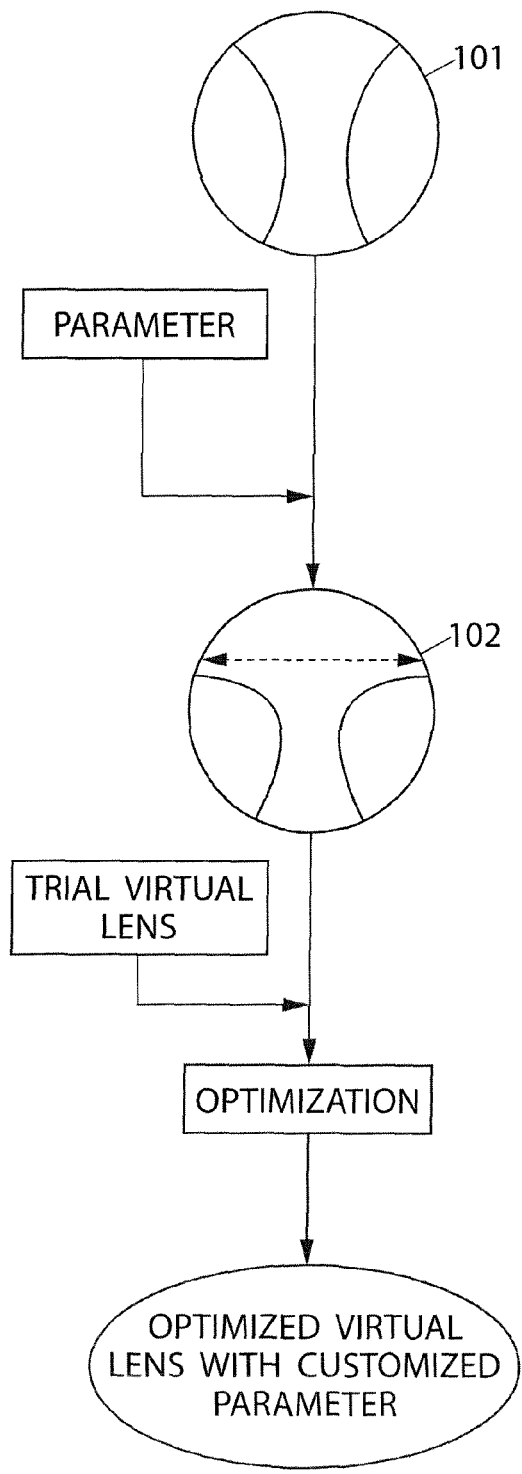
FIGS. 11 and 12 are diagrammatic views of flow diagrams of the use of geometrical data which correspond to another embodiment of the invention.
Figure 12:
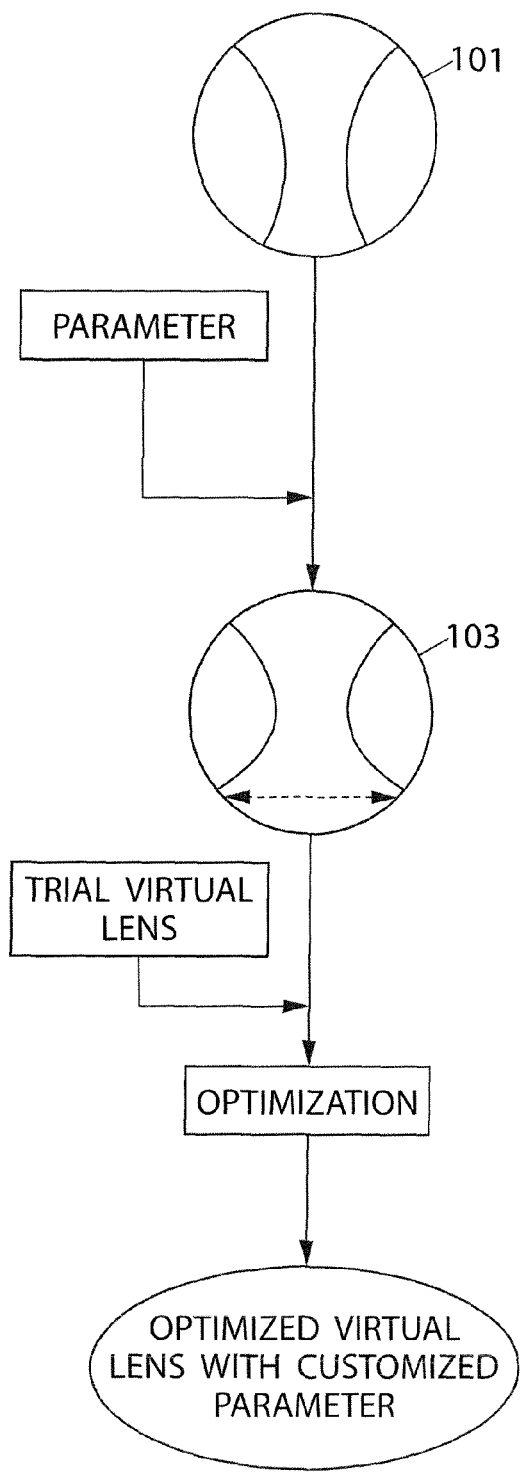

FIGS. 11 and 12 are diagrammatic views of flow diagrams which illustrate embodiments where a design feature to be customized is a vision zone size.

According to the embodiment illustrated in FIG. 11, the wearer wishes to prioritize distance vision. This priority may also be chosen by the eye care professional or be the result from a model providing the size of the zone based on the wearer's characteristics as life style for example. A first target virtual lens 101 is chosen, based on a standard design model.

A parameter of the distance vision zone, as for example the width or the height of the distance vision zone, or a combination thereof, is then introduced so that to modify the first target virtual lens 101 and then provide a second target virtual lens 102.

A trial virtual lens is then optimized in such a manner that it has optical characteristics which are substantially equal to the characteristics of the second target virtual lens.

The customized lens can then be manufactured using for example free form machining and the final lens is suitable to the specific wearer's needs.

FIG. 12 illustrates an embodiment where the wearer wishes to prioritize near vision. The general flow diagram is similar to the preceding one, and the parameter that is introduced so that to modify the same first virtual lens 101 is a parameter of the near vision zone, so as for example the width or the height of the near vision zone, or a combination thereof.

A second target virtual lens 103 is then provided and an optimized trial virtual lens is obtained and the final customized lens is manufactured.

It is this possible to advantageously customize lens to wearer's viewing preferences.

It will be understood that these improvements are not indispensable to the implementation of the invention. In addition, other embodiments may be used, different from those that have been described in detail with reference to FIGS. 2 to 12, while at the same time conserving at least some of the advantages of the invention.

It has to be understood that although the here above described examples correspond to the customization of one exemplified design feature, several design features may be customized for designing the same final lens.

Furthermore, the mathematical transformations that have been previously exemplified to obtain the second target virtual lens by modifying the first target virtual lens are non limiting.

It has to be understood that a wide number of mathematical functions may be suitable within the frame of the invention such as for example shear function, dilatation function, compression function, shift function, translation, rotation or other function that could be suitable to modify or transform a design feature parameter so as to customize a final lens for a wearer's need. As for an example, a mathematical transformation may include weight ratio to differentiate the effect of a mathematical function according to different zones to be transformed. Furthermore, an optimization step may be used to obtain the second target virtual lens by modifying the first target virtual lens.

The non limiting previously exemplified design features are the inset, frame design parameters, size of the distance or the near vision zone. It has to be understood that all possible design features of an ophthalmic progressive addition lens can be customized according to the present invention, such as for example the head-eye movement ratio.

The invention claimed is:

1. A method for manufacturing an ophthalmic progressive addition lens with customized design features adapted to a wearer, the method comprising the following steps:
   /a/ a providing step of a lens substrate;
   /b/ a modifying step in which a first target virtual lens is provided and modified so as to obtain a second target virtual lens, the second target virtual lens having a design feature parameter substantially equal to a customized design feature parameter, wherein a "virtual lens" is a lens which does not exist in reality such as a computer generated lens and whose front and rear faces are numerically defined, and which is used to perform optical or surface calculations or which results from such calculations;
   /c/ an optimizing step in which an optimized trial virtual lens is obtained by optimizing a trial virtual lens in such a manner that the optimized trial virtual lens has optical characteristics which are substantially equal to the characteristics of the second target virtual lens; and
   /d/ a manufacturing step of the ophthalmic progressive addition lens from the lens substrate according to the optimized trial virtual lens.

2. The method according to claim 1, in which at least one customized design feature is chosen from the list consisting of the size parameters of vision zones of the ophthalmic progressive addition lens, the inset (In) of the wearer, frame design parameters of the frame chosen by the wearer, and wearer's viewing preferences.

3. The method according to claim 2 in which the size parameters of the vision zones of the ophthalmic progressive addition lens are chosen and include at least one parameter within the list consisting of the size parameters of the near vision zone, the size parameters of the intermediate vision zone, and the size parameters of the distance vision zone.

4. The method according to claim 2 in which the size parameters of a vision zone are chosen and include at least one parameter within the list consisting of the width of the vision zone, the height of the vision zone, a combination of the width of the vision zone and the height of the vision zone, and the surface of a vision zone.

5. The method according to claim 2 in which the size parameters of vision zones of the ophthalmic progressive addition lens are chosen and include a ratio between two size parameters of two different vision zones.

6. The method according to claim 2 in which the frame design parameters are chosen and include at least one parameter within the list consisting of the width of the frame, the height of the frame, a combination of the width of the frame and of the height of the frame, and the aspect ratio of the frame.

7. The method according to claim 2 in which the wearer's viewing preferences are chosen and include at least one parameter within the list consisting of maximizing the distance viewing comfort, maximizing the intermediate viewing comfort, and maximizing the near viewing comfort.

8. The method according to claim 1, in which the ophthalmic progressive addition lens comprises:
   a front face (S0) with progressive power addition between a distance-vision point (VL) and a near-vision point (VP) of the said ophthalmic progressive addition lens, the said front face having a standard design feature parameter, and
   a rear face (S1) adapted in order to provide, in combination with the front face, a vision correction according to a prescription established for a wearer of the said ophthalmic progressive addition lens, and also adapted in order to give to said ophthalmic progressive addition lens an apparent design feature parameter customized for the said wearer that is different from the standard design feature parameter of the front face.

9. The method according to claim 1, in which
   step /a/ is obtaining a semi-finished lens having a power addition front face (S0) and a standard design feature parameter;
   step /b/ is defining the second target virtual lens comprising a front face with a power addition substantially equal to the addition of the lens to be manufactured, and a rear face adapted so that the said second target virtual lens corresponds to the vision correction prescribed for the said wearer, the said front face of the second target virtual lens also having a design feature parameter substantially equal to the customized apparent design feature parameter;
   step /c/ is by calculation, optimizing a trial virtual lens having the fixed front face of the semi-finished lens, and having a variable rear face, in such a manner that the said trial virtual lens has optical characteristics substantially equal to the characteristics of the second target virtual lens; and
   step /d/ is machining the rear of the semi-finished lens (S1) according to the rear face of the optimized trial virtual lens.

10. The method according to claim 9, in which the step /b/ itself comprises the following two sub-steps:
   /b1/ define the first target virtual lens having the front face of the semi-finished lens (S0) and a virtual rear face with uniform values of average sphere and of cylinder selected such that the said first target virtual lens corresponds to the prescribed vision correction; and
   /b2/ define the second target virtual lens by applying by calculation a shear function to optical characteristics of the said intermediate virtual lens, the shear function being applied in a direction parallel to a horizontal direction (X) in at least a part of the lens situated underneath the distance-vision point, with respect to a usage position of the ophthalmic progressive addition lens, and being selected in such a manner that the said second target virtual lens has the customized apparent design feature parameter.

11. The method according to claim 9, in which the step /b/ itself comprises the following sub-steps:
/b1'/ apply by calculation a shear function to surface characteristics of the front face of the semi-finished lens (S0), in such a manner as to obtain a modified virtual front face having the progressive power addition of the semi-finished lens and the customized design feature parameter, the shear function being applied in a direction parallel to a horizontal direction (X) in at least a part of the front face situated underneath the distance-vision point, with respect to a usage position of the ophthalmic progressive addition lens;
/b2'/ optimize surface characteristics of the virtual front face modified by the shear function, with respect to target surface characteristics corresponding to the power addition of the semi-finished lens and to the customized design feature parameter; and
/b3'/ define the second target virtual lens by associating the front face modified by the shear function and optimized with a virtual rear face with uniform values of average sphere and of cylinder selected in such a manner that the said second target virtual lens corresponds to the prescribed vision correction.

12. The method according to claim 9, in which the step /b/ itself comprises the following sub-steps:
/b1"/ obtain at least two reference front faces corresponding to two respective design features parameters;
/b2"/ calculate the front face of the second target virtual lens by mixing the said two reference front faces, in such a manner as to obtain a mixed front face having the customized design features parameters; and
/b3"/ define the second target virtual lens by associating the mixed front face with a virtual rear face with uniform values of average sphere and of cylinder selected in such a manner that the said second target virtual lens corresponds to the prescribed vision correction.

13. The method according to claim 12, in which one of the two reference front faces obtained in step /b1"/ is the front face of the semi-finished lens (S0) obtained in step /a/.

14. The method according to claim 11, in which the optimization in step /c/ is carried out by initially assigning to the trial virtual lens a rear face corrected with the difference between the front face of the semi-finished lens (S0) and the front face of the second target virtual lens, with respect to the uniform values of average sphere and of cylinder.

15. The method according to claim 9, in which the second target virtual lens is defined in step /b/ with a base value of front face different from a base value selected for the semi-finished lens as a function of the prescribed vision correction, in such a manner as to minimize optical aberrations of the ophthalmic progressive addition lens manufactured.

16. The method according to claim 2 in which a customized design feature is a frame design parameter and where the method comprises following steps:
measuring parameters representing the frame chosen by the wearer;
choosing an initial distribution of power and resulting astigmatism defect targets for each direction of viewing under wearing conditions in an ordinary frame, thus providing the first target virtual lens;
calculating transformation coefficients using the measured parameters representing the chosen frame and standard parameters;
calculating a personalized distribution of the power and resulting astigmatism defect targets on the lens by applying the calculated transformation coefficients to the initial distribution, thus obtaining the second target virtual lens; and
calculating the power required on the lens for each direction of viewing by successive iterations in order to obtain the target power defect and the target astigmatism defect and obtaining an optimized trial virtual lens by optimization of a trial virtual lens.

17. The method of claim 16, in which the stage of measuring parameters representing the frame comprises the stages of:
measuring the width (A) of the cut-out lens;
measuring the width of the bridge (P) of the chosen frame;
measuring the interpupillary distance of the wearer (EP);
measuring the fitting height (HD, HG, HDd, HGd) as the vertical distance between a point of the lens (CM) marking the primary direction of viewing under wearing conditions and a given point of the frame;
calculating a horizontal parameter (A') taking into account the width of the cut-out lens, the bridge width and the interpupillary distance measured; and
calculating a vertical parameter (B') taking into account the fitting height measured.

18. The method of claim 16, in which the stage of calculating transformation coefficients comprises the stages of calculating:
a horizontal coefficient ($\gamma$) which is the ratio between a horizontal parameter (A') calculated for the frame chosen by the wearer and a standard horizontal parameter ($A'_{av}$); and
a vertical coefficient ($\delta$) which is the ratio between a vertical parameter (B') calculated for the frame chosen by the wearer and a standard vertical parameter ($B'_{av}$).

19. The method of claim 16, in which the stage of calculation of transformation coefficients comprises the stages of:
calculating a vertical coefficient ($\delta$) which is the ratio between a vertical parameter (B') calculated for the frame chosen by the wearer and a standard vertical parameter ($B'_{av}$); and
determining a horizontal coefficient ($\gamma$) which is set equal to the vertical coefficient ($\delta$).

20. The method of claim 18, in which the vertical coefficient ($\delta$) is limited to a lower value equal to 0.65 and to an upper value equal to 1.5.

21. The method of claim 18, in which the horizontal coefficient ($\gamma$) is limited to a lower value equal to 0.55 and to an upper value equal to 1.25.

22. The method of claim 18, in which the ratio ($\delta/\gamma$) of the vertical coefficient ($\delta$) over the horizontal coefficient ($\gamma$) is limited to a lower value equal to 0.5 and to an upper value equal to 3.0.

23. The method of claim 16, in which the stage of calculating the personalized distribution of the power and resulting astigmatism defect targets on the lens comprises the stages of:
determining a vertical and horizontal mesh associating a point to each direction of viewing under wearing conditions, there being associated with each point of the mesh spherical coordinates ($\beta$, $\alpha$) of the direction of viewing and power and resulting astigmatism defect values corresponding to the initial distribution chosen for the targets; and at each point of the mesh, applying the transformation coefficients calculated to the spherical coordinates ($\beta$, $\alpha$) maintaining the power and resulting astigmatism defect target values constant.

24. The method of claim 23, in which applying the transformation coefficients calculated ($\gamma$, $\delta$) to the spherical coordinates ($\beta$, $\alpha$) consists in multiplying the horizontal angular value ($\beta$) by the horizontal coefficient ($\gamma$) and multiplying the vertical angular value ($\alpha$) by the vertical coefficient ($\delta$).

25. The method of claim 23, in which calculating the personalized distribution of the targets is carried out and, furthermore is done whilst maintaining constant the ratio of the area of the lens surface for which the resulting astigmatism defect is less than or equal to 0.5 diopters over the total surface of the cut-out lens.

26. The method according to claim 1, in which the second target virtual lens corresponds to the vision correction prescribed for the wearer and has a design feature parameter substantially equal to a customized design feature parameter.

27. A method using a computer to provide, to a lens manufacturing machine, information representing a customized ophthalmic progressive addition lens with customized design features, with the provision that the design feature is not a frame design parameter, comprising:
 a modifying step in which a first target virtual lens is provided and modified so as to obtain a second target virtual lens, the second target virtual lens having a design feature parameter substantially equal to a customized design feature parameter, wherein a "virtual lens" is a lens which does not exist in reality such as a computer generated lens and whose front and rear faces are numerically defined, and which is used to perform optical or surface calculations or which results from such calculations;
 an optimizing step in which an optimized trial virtual lens is obtained by optimizing a trial virtual lens in such a manner that the optimized trial virtual lens has optical characteristics which are substantially equal to the characteristics of the second target virtual lens; and
 an outputting step in which the information representing the customized ophthalmic progressive addition lens, according to the optimized trial virtual lens, is output from the computer to the lens manufacturing machine.

28. The method of claim 27 in which the ophthalmic progressive addition lens comprises:
 a front face (S0) with progressive power addition between a distance-vision point (VL) and a near-vision point (VP) of the said ophthalmic progressive addition lens, the said front face having a standard design feature parameter, and
 a rear face (S1) adapted in order to provide, in combination with the front face, a vision correction according to a prescription established for a wearer of the said ophthalmic progressive addition lens, and also adapted in order to give to said ophthalmic progressive addition lens an apparent design feature parameter customized for the said wearer that is different from the standard design feature parameter of the front face, and
the method comprising the following steps:
 /a/ providing a semi-finished lens design having the said power addition front face (S0) and the said standard design feature parameter;
 /b/ define the second target virtual lens comprising a front face with a power addition substantially equal to the addition of the ophthalmic progressive addition lens to be manufactured, and a rear face adapted so that the said second target virtual lens corresponds to the vision correction prescribed for the said wearer, the said front face of the second target virtual lens also having a design feature parameter substantially equal to the customized apparent design feature parameter; and
 /c/ by calculation, optimize a trial virtual lens having the fixed front face of the semi-finished lens, and having a variable rear face, in such a manner that the said trial virtual lens has optical characteristics substantially equal to the characteristics of the second target virtual lens.

29. The method according to claim 27, in which the second target virtual lens corresponds to the vision correction prescribed for the wearer and has a design feature parameter substantially equal to a customized design feature parameter.

30. A computer program product comprising one or more stored sequence of instruction that is accessible to a processor and which, when executed by the processor, causes the processor to carry out the steps of claim 1.

31. A computer program product comprising one or more stored sequence of instruction that is accessible to a processor and which, when executed by the processor, causes the processor to carry out the steps of claim 27.

32. A computer-readable medium carrying one or more sequences of instructions of the computer program product of claim 30.

33. A computer-readable medium carrying one or more sequences of instructions of the computer program product of claim 31.

\* \* \* \* \*